US012575693B2

(12) United States Patent
Knowles et al.

(10) Patent No.: US 12,575,693 B2
(45) Date of Patent: Mar. 17, 2026

(54) SMART BEVERAGE SYSTEM, APPARATUS, AND METHOD OF USING SAME

(71) Applicant: Lugi Lavazza S.p.A., Turin (IT)

(72) Inventors: David Knowles, St Albans (GB); Tony McCoy, Devon (GB)

(73) Assignee: Luigi Lavazza S.p.A., Turin (IT)

( * ) Notice: Subject to any disclaimer, the term of this patent is extended or adjusted under 35 U.S.C. 154(b) by 856 days.

(21) Appl. No.: 17/621,132

(22) PCT Filed: Jun. 24, 2020

(86) PCT No.: PCT/US2020/039289
§ 371 (c)(1),
(2) Date: Dec. 20, 2021

(87) PCT Pub. No.: WO2020/263928
PCT Pub. Date: Dec. 30, 2020

(65) Prior Publication Data
US 2022/0346591 A1 Nov. 3, 2022

Related U.S. Application Data

(60) Provisional application No. 62/865,419, filed on Jun. 24, 2019.

(51) Int. Cl.
*A47J 31/52* (2006.01)
*A47J 31/00* (2006.01)
(52) U.S. Cl.
CPC ........... *A47J 31/521* (2018.08); *A47J 31/002* (2013.01); *A47J 31/5251* (2018.08)
(58) Field of Classification Search
CPC ........ A47J 31/002; A47J 32/02; A47J 31/521; A47J 31/525; A47J 31/5251; A47J 31/52
(Continued)

(56) References Cited

U.S. PATENT DOCUMENTS

| | | | | |
|---|---|---|---|---|
| 7,455,867 B1 * | 11/2008 | Gutwein | ............... | A47J 31/002 |
| | | | | 426/433 |
| 2011/0121032 A1 | 5/2011 | Deo | | |

(Continued)

FOREIGN PATENT DOCUMENTS

| | | |
|---|---|---|
| CA | 3097415 | 10/2019 |
| CN | 101797120 | 8/2010 |

(Continued)

OTHER PUBLICATIONS

International Search Report for parent PCT/US2020/039289 mailed Dec. 2, 2020.

*Primary Examiner* — Reginald Alexander
(74) *Attorney, Agent, or Firm* — The Belles Group, P.C.

(57) ABSTRACT

A method for making and/or dispensing a beverage may be provided. For example, a beverage may be selected from a user interface of a beverage dispensing apparatus. A beverage pressure value may be provided. A package containing a beverage preparation ingredient may be inserted into the beverage dispensing apparatus. A type of the inserted package may be detected. A package pressure value for the inserted package may be determined based on the type of the inserted package. If the package pressure value corresponds to the beverage pressure value, the beverage dispensing apparatus may inject a liquid into the inserted package at the beverage pressure value. If the package pressure value does not correspond to the beverage pressure value, the beverage dispensing apparatus may inject the liquid into the inserted package at the package pressure value. The selected beverage and/or the modified beverage may be dispensed into a drinking vessel.

19 Claims, 11 Drawing Sheets

(58) Field of Classification Search
USPC .......................................... 99/280, 282, 283
See application file for complete search history.

(56)                    References Cited

U.S. PATENT DOCUMENTS

| | | |
|---|---|---|
| 2011/0123688 A1 | 5/2011 | Deo et al. |
| 2012/0173357 A1* | 7/2012 | Yoakim ................... G07F 13/06 |
| | | 705/28 |
| 2012/0231126 A1 | 9/2012 | Lo Faro et al. |
| 2014/0272049 A1* | 9/2014 | Azzano ............... A47J 31/4403 |
| | | 426/433 |
| 2016/0051078 A1* | 2/2016 | Jenkins ..................... F24C 7/08 |
| | | 99/341 |
| 2016/0130068 A1 | 5/2016 | Epars |
| 2017/0172340 A1* | 6/2017 | Baarman ............. A47J 31/5253 |
| 2017/0240404 A1 | 8/2017 | Pellaud |
| 2017/0295988 A1 | 10/2017 | Chung |
| 2018/0292092 A1* | 10/2018 | Bhogal ................... F24C 7/085 |
| 2018/0365924 A1 | 12/2018 | Yoakim |

FOREIGN PATENT DOCUMENTS

| | | |
|---|---|---|
| CN | 201840328 | 5/2011 |
| CN | 102105088 | 6/2011 |
| CN | 103876626 | 6/2014 |
| CN | 104586255 | 5/2015 |
| CN | 105661242 | 6/2016 |
| CN | 105722440 | 6/2016 |
| CN | 106458561 | 2/2017 |
| CN | 208677071 | 4/2019 |
| CN | 208677078 | 4/2019 |
| WO | WO 2018/046400 A1 | 3/2018 |
| WO | WO 2018/229102 A1 | 12/2018 |

* cited by examiner

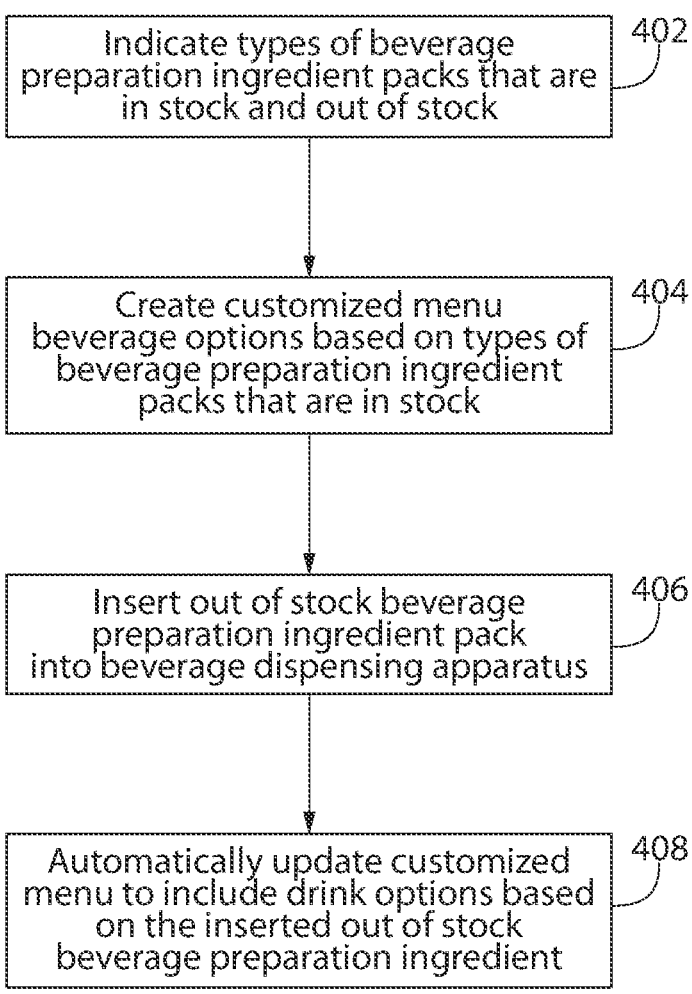

Indicate types of beverage
preparation ingredient packs that are
in stock and out of stock                402

Create customized menu
beverage options based on types of
beverage preparation ingredient
packs that are in stock                  404

Insert out of stock beverage
preparation ingredient pack
into beverage dispensing apparatus       406

Automatically update customized
menu to include drink options based
on the inserted out of stock
beverage preparation ingredient          408

FIG. 5

Receive a first beverage pack and produce a first beverage based on the first beverage pack — 602

Receive a second beverage pack and produce a second beverage based on the second beverage pack — 604

Combine second beverage and first beverage — 606

Identify combination of first and second beverage as a custom beverage — 608

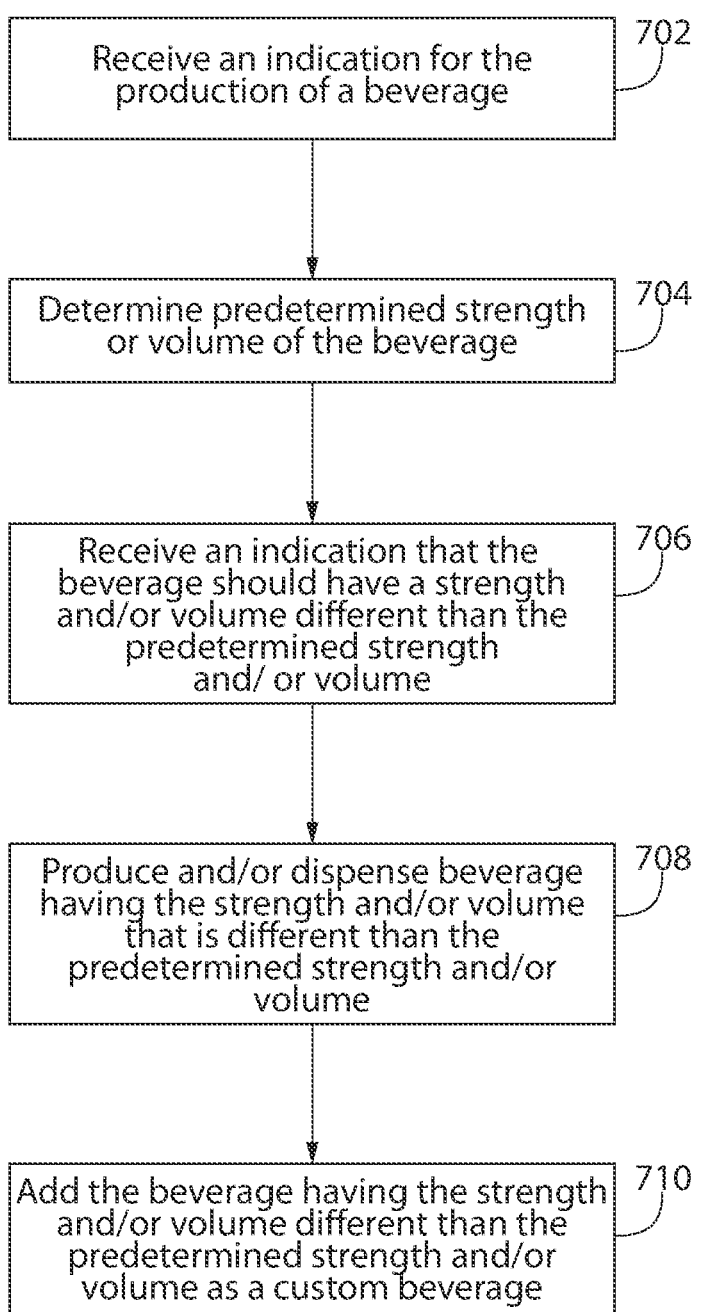

Receive an indication for the production of a beverage — 702

Determine predetermined strength or volume of the beverage — 704

Receive an indication that the beverage should have a strength and/or volume different than the predetermined strength and/ or volume — 706

Produce and/or dispense beverage having the strength and/or volume that is different than the predetermined strength and/or volume — 708

Add the beverage having the strength and/or volume different than the predetermined strength and/or volume as a custom beverage — 710

FIG. 8

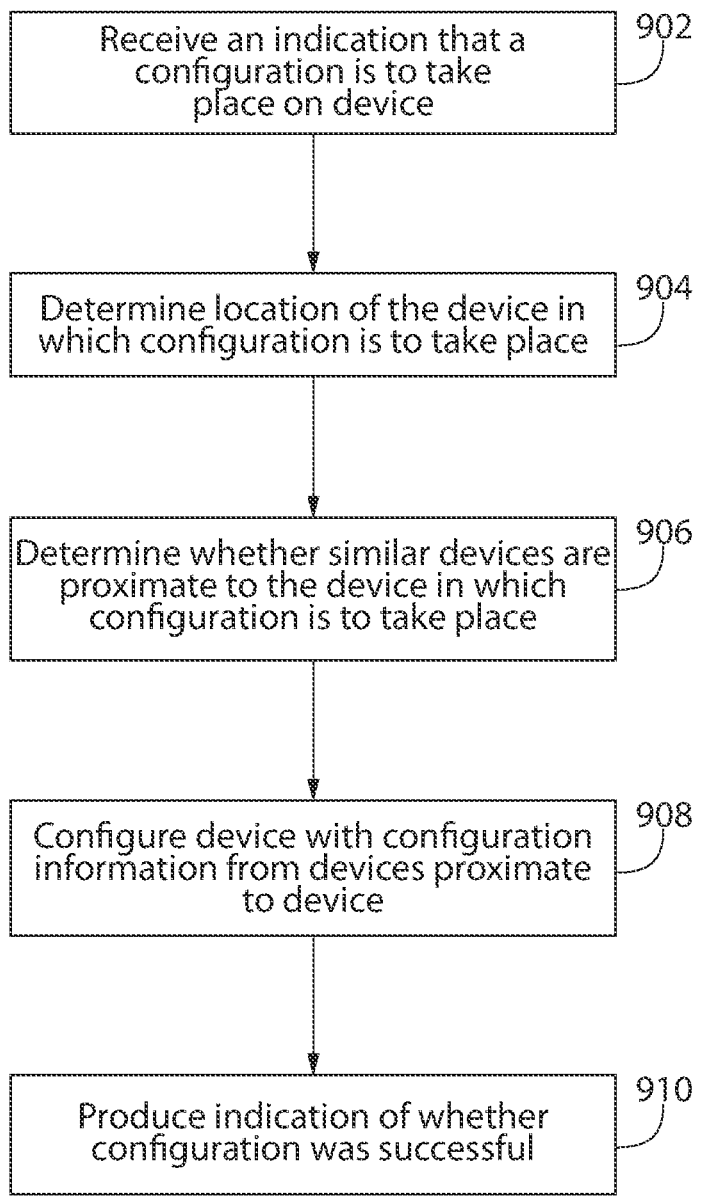

Receive an indication that a configuration is to take place on device 902

Determine location of the device in which configuration is to take place 904

Determine whether similar devices are proximate to the device in which configuration is to take place 906

Configure device with configuration information from devices proximate to device 908

Produce indication of whether configuration was successful 910

FIG. 10

SMART BEVERAGE SYSTEM, APPARATUS, AND METHOD OF USING SAME

CROSS-REFERENCE TO RELATED PATENT APPLICATIONS

The present application is a U.S.C. § 371 National Stage Entry of Patent Cooperation Treaty Patent Application No. PCT/US2020/039289 that claims the benefit of U.S. Provisional Patent Application Ser. No. 62/865,419, filed Jun. 24, 2019, the contents of all of which are hereby incorporated herein by reference in their respective entireties, for all purposes.

BACKGROUND

High-pressure brewing devices and related beverage preparation machines are known. Conventional brewing devices make beverages based on a user physically interacting with the brewing device. Most conventional brewing devices simply make and dispense the beverage and do not include any means of receiving or transmitting information about the use of the brewing device. What is desired is a brewing device that is capable of receiving information from one or more electronic devices, such as a user's smartphone or tablet. Such information may be useful for increasing the user's experience of the coffee maker in a number of ways.

BRIEF SUMMARY

A system, apparatus, and/or method for making and dispensing a beverage may be provided. For example, a beverage may be selected from a beverage menu on a user interface of a beverage dispensing apparatus. The beverage dispensing apparatus may make the selected beverage. A beverage pressure value may be provided. A package containing a beverage preparation ingredient may be inserted into the beverage dispensing apparatus. A type of the inserted package may be detected. A package pressure value for the inserted package may be determined based on the type of the inserted package. If the package pressure value corresponds to the beverage pressure value, the beverage dispensing apparatus may inject a liquid into the inserted package at the beverage pressure value to make the selected beverage. If the package pressure value does not correspond to the beverage pressure value, the beverage dispensing apparatus may inject the liquid into the inserted package at the package pressure value in accordance with the adjusted instructions to make a modified beverage. The selected beverage and/or the modified beverage may be dispensed into a drinking vessel.

In an aspect the beverage pressure value may be a high pressure or a low pressure and/or the beverage package pressure value may be a high pressure or a low pressure. In examples, if the beverage package pressure value does not correspond to the beverage pressure value, the processor may adjust the instructions without indicating the adjustment to a user. If the beverage package pressure value does not correspond to the beverage pressure value, an audio and/or visual indication may be provided when the processor adjusts the instructions. The modified beverage may relate to a beverage previously selected by a user of the beverage dispensing apparatus. The processor may determine the modified beverage via machine learning techniques.

In an aspect, a beverage dispensing system may include a beverage dispensing apparatus. A user interface may display a beverage menu including a plurality of beverages that can be dispensed by the beverage dispensing apparatus. A package holder may be configured to hold a beverage package containing a beverage ingredient. A memory device may contain instructions for making each of the beverages listed in the beverage menu, the instructions including a beverage pressure value at which a liquid is to be injected into the beverage package during formation of the beverage. A processor may be configured to detect a type of the beverage package that is being held in the package holder and to determine a package pressure value for the beverage package. Upon a user selecting a beverage from the beverage menu on the user interface, the processor may determine whether the beverage pressure value corresponds to the package pressure value. If the package pressure value corresponds to the beverage pressure value, the beverage dispensing apparatus may be configured to inject a liquid into the beverage package at the beverage pressure value to make the beverage. If the package pressure value does not correspond to the beverage pressure value, the processor may be configured to adjust the instructions so that the beverage dispensing apparatus injects the liquid into the beverage package at the package pressure value to make a modified beverage.

In an aspect, a method of customizing a beverage menu of a beverage dispensing apparatus may be provided. The method may include displaying, on a user interface of the beverage dispensing apparatus, a menu including a plurality of beverage options, wherein the plurality of beverage options are customized based on an available status of beverage preparation ingredient package types at a geographic location; receiving, into the beverage dispensing apparatus, a beverage preparation ingredient package type having an unavailable status at the geographic location; updating from the unavailable status to the available status, the beverage preparation ingredient package type received into the beverage dispensing apparatus; and causing the beverage menu to display one or more additional beverage options that are producible using the beverage preparation ingredient package type updated from the unavailable status to the available status.

In an aspect, a beverage dispensing system may include a beverage dispensing apparatus. A user interface may display a menu including a plurality of beverage options, wherein the plurality of beverage options are customized based on an available status of beverage preparation ingredient package types at a geographic location. A package holder may be configured to receive a beverage preparation ingredient package type, the beverage preparation ingredient package type including at least one of available status or an unavailable status at the geographic location. A processor may be configured to update a status of beverage preparation ingredient package type from the unavailable status to the available status when the beverage preparation ingredient package type receives an unavailable beverage preparation ingredient package type into the package holder. The user interface may display one or more additional beverage options that are producible using the beverage preparation ingredient package type updated from the unavailable status to the available status.

In an aspect, a method of customizing a beverage menu of a beverage dispensing apparatus may be provided. The method may include indicating, to a processor of the beverage dispensing apparatus, which of a plurality of beverage preparation ingredient package types are available packages and which of the plurality of beverage preparation ingredient package types are unavailable packages; displaying, on a user interface of the beverage dispensing apparatus, a customized menu including a plurality of beverage options that can be produced using the packages indicated as available; receiving, into the beverage dispensing apparatus, a package indicated as unavailable, the processor of the beverage dispensing apparatus determining that the received package indicated as unavailable is a package newly indicated as available; and updating (e.g., automatically updating), via the processor of the beverage dispensing apparatus, the customized menu to include one or more additional beverage options that are producible using the package newly indicated as available.

In an aspect, a method of producing customized beverages with a beverage dispensing apparatus may be provided. The method may include receiving, via the beverage dispensing system, a first beverage preparation ingredient package, the beverage dispensing apparatus being in operable communication with a server; causing the beverage dispensing apparatus to inject a first volume of liquid into the first beverage preparation ingredient package to form a first non-customized beverage and dispensing the first non-customized beverage into a drinking vessel; receiving, via the beverage dispensing system, a second beverage preparation ingredient package, the second beverage preparation ingredient and the first beverage preparation ingredient forming a beverage that is not a default beverage of the beverage dispensing apparatus; causing the beverage dispensing apparatus to inject a second volume of liquid into the second beverage preparation ingredient package to form a second non-customized beverage; dispensing the second non-customized beverage into the first beverage in the drinking vessel, thereby forming a customized beverage; and transmitting data related to the customized beverage from the beverage dispensing apparatus to the server.

In an aspect, a beverage dispensing system may include a beverage dispensing apparatus being in operable communication with a server. A package holder may be configured to receive a first beverage preparation ingredient package and a second beverage preparation ingredient package, the second beverage preparation ingredient and the first beverage preparation ingredient forming a beverage that is not a default beverage of the beverage dispensing apparatus. A processor may be configured to: cause the beverage dispensing apparatus to (1) inject a first volume of liquid into the first beverage preparation ingredient package to form a first non-customized beverage and (2) dispense the first non-customized beverage into a drinking vessel; cause the beverage dispensing apparatus to inject a second volume of liquid into the second beverage preparation ingredient package to form a second non-customized beverage and dispense the second non-customized beverage into the first beverage in the drinking vessel, thereby forming a customized beverage; and cause data related to the customized beverage to be transmitted from the beverage dispensing apparatus to the server.

In an aspect, a method for customizing a beverage being dispensed from a beverage dispensing apparatus may be provided. The method may include selecting, from a plurality of beverage types, a first beverage type to be produced by and dispensed from the beverage dispensing apparatus, the beverage dispensing apparatus including a processor operably coupled to a memory device storing default instructions for making a beverage of the first beverage type. The default instructions may include a preset volume and a preset strength; receiving, via a user interface of the beverage dispensing apparatus, at least one of: (1) a strength of the beverage to a modified strength that is lower or higher than the preset strength; or (2) a volume of the beverage to a modified volume that is lower or higher than the preset volume; causing the beverage dispensing apparatus to produce and dispense the beverage of the first beverage type having at least one of the modified strength or the modified volume; associating, with a user of the beverage dispensing apparatus, the beverage of the first beverage type having at least one of the modified strength or the modified volume; and storing the association of the user with the beverage of the first beverage type having at least one of the modified strength or the modified volume.

In an aspect, a beverage dispensing system may be provided. A memory device may be configured to store default instructions for making a beverage of a beverage type, the default instructions including a preset volume and a preset strength. A processor may be operably coupled to the memory. A beverage dispensing apparatus may include a user interface configured to receive (1) and indication of the beverage type to be produced by and dispensed from the beverage dispensing apparatus and (2) at least one of a strength of the beverage to a modified strength that is lower or higher than the preset strength; or a volume of the beverage to a modified volume that is lower or higher than the preset volume. The processor may be configured to cause the beverage dispensing apparatus to produce and dispense the beverage of the beverage type having at least one of the modified strength or the modified volume.

In an aspect, a method for soliciting user feedback while making and dispensing a beverage with a beverage dispensing apparatus may be provided. The method includes causing the beverage dispensing apparatus to produce or dispense a beverage; displaying, via a user interface of the beverage dispensing apparatus, one or more questions while the beverage dispensing apparatus is producing the beverage or dispensing the beverage; receiving, from a user of the beverage dispensing apparatus via the user interface, responses to the one or more questions; and storing the responses on a memory device.

In an aspect, a beverage dispensing system may be provided. A processor may be configured to cause the beverage dispensing apparatus to produce a beverage. A user interface of the beverage dispensing apparatus may be configured to display one or more questions while the beverage dispensing apparatus is producing the beverage or dispensing the beverage; and receive responses to the one or more questions. A memory device may be operably coupled to the processor and configured to store the responses to the one or more questions.

In an aspect, a method of providing fault information relating to a beverage dispensing apparatus may be provided. The method includes attempting to activate the beverage dispensing apparatus to produce and dispense a beverage, the beverage dispensing apparatus being non-due to an occurrence of a fault; automatically transmitting, from the beverage dispensing apparatus to an electronic device, fault information related to the occurrence of the fault, the fault information including a fault identifier, a date and a time associated with the occurrence of the fault, and a date and a time associated with the repair of the fault; determining an efficiency of the repair of the fault based on the fault information; and storing, on a memory device, the efficiency of the repair of the fault.

In an aspect, a beverage dispensing system may be provided. A beverage dispensing apparatus may include a user interface for receiving an indication for operating the beverage dispensing apparatus. A processor may be configured to detect that the beverage dispensing apparatus is non-operational due to an occurrence of a fault; cause the transmission, from the beverage dispensing apparatus to an electronic device, fault information related to the occurrence of the fault, the fault information including a fault identifier, a date and a time associated with the occurrence of the fault, and a date and a time associated with the repair of the fault; determine an efficiency of the repair of the fault based on the fault information; and store, on a memory device, the efficiency of the repair of the fault.

In an aspect, a method of tracking a response to a fault of a beverage dispensing apparatus may be provided. The method may include displaying, on a user interface of a beverage dispensing apparatus, an indication related to a fault of the beverage dispensing apparatus or a report of the beverage dispensing apparatus; receiving, on the user interface, input requesting that information related to the fault of the beverage dispensing apparatus or the report of the beverage dispensing apparatus be provided; providing, via the user interface, information related to the fault of the beverage dispensing apparatus or the report of the beverage dispensing apparatus; receiving, via the user interface, an indication to clear the indication related to a fault of the beverage dispensing apparatus or a report of the beverage dispensing apparatus; and saving, via a memory device, the indication related to a fault of the beverage dispensing apparatus or a report of the beverage dispensing apparatus.

In an aspect, a beverage dispensing system may be provided. A beverage dispensing apparatus may include a user interface configured to: display an indication related to a fault of the beverage dispensing apparatus or a report of the beverage dispensing apparatus; receive an input requesting that information related to the fault of the beverage dispensing apparatus or the report of the beverage dispensing apparatus be provided; provide information related to the fault of the beverage dispensing apparatus or the report of the beverage dispensing apparatus; and receive an indication to clear the indication related to a fault of the beverage dispensing apparatus or a report of the beverage dispensing apparatus. A memory device may be configured to save the indication related to a fault of the beverage dispensing apparatus or a report of the beverage dispensing apparatus.

In an aspect, a method of configuring a beverage dispensing apparatus may be provided. The method may include receiving, via a user interface of the beverage dispensing apparatus, an indication to commence a configuration activity upon the beverage dispensing apparatus; identifying another beverage dispensing apparatus having a location that is proximate to a location of the beverage dispensing apparatus; determining the identification of the other beverage dispensing apparatus having a location that is proximate to the location of the beverage dispensing apparatus; receiving configuration information associated with the other beverage dispensing apparatus having a location that is proximate to the location of the beverage dispensing apparatus; and storing, on a memory device, the configuration information associated with the other beverage dispensing apparatus.

In an aspect, a beverage dispensing system may be provided. A beverage dispensing apparatus having a first location may be provided, the beverage dispensing apparatus including a user interface configured to receive an indication to commence a configuration activity upon the beverage dispensing apparatus. A processor may be configured to: identify another beverage dispensing apparatus having a second location that is proximate to the first location of the beverage dispensing apparatus; determine the identification of the other beverage dispensing apparatus having the second location that is proximate to the first location of the beverage dispensing apparatus; receive configuration information associated with the other beverage dispensing apparatus having the second location that is proximate to the first location of the beverage dispensing apparatus. A memory device may be configured to store the configuration information associated with the other beverage dispensing apparatus.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is an example process for updating a menu of a beverage dispensing apparatus based on an inventory.

FIG. 8 is an example process for customizing a strength and/or volume of a beverage.

FIG. 10 shows an example process for configuring a beverage dispensing apparatus.

DETAILED DESCRIPTION

Figure 1:
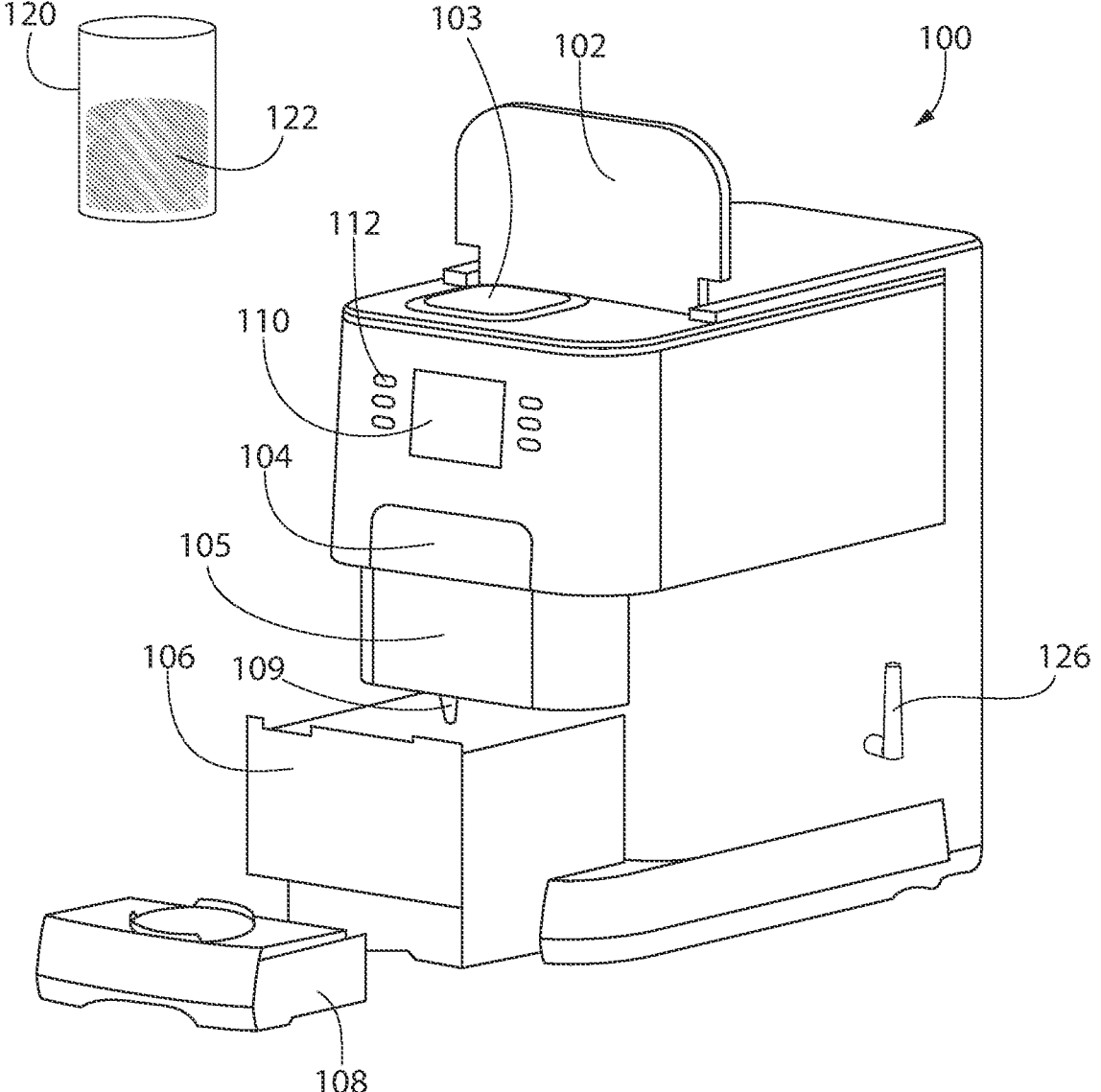
FIG. 1 is an example beverage dispensing apparatus that may perform one or more operations, as described herein.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring now to the figures, FIG. 1 is an example beverage preparation machine 100. Beverage preparation machine 100 may be a residential machine or a commercial machine (e.g., located at a business or public location). Beverage preparation machine 100 may prepare one or more types of beverages, such as coffee, tea, chocolate, milk, soup, etc. Beverage preparation machine 100 may prepare a beverage by passing water (e.g., hot or cold water), or another liquid, through a beverage packet, such as beverage packet 120. Beverage packet 120 may contain an ingredient, such as ingredient 122. Ingredient 122 may be a flavor ingredient to prepare the beverage. As an example, ingredient 122 may be ground coffee, tea, chocolate, or milk powder.

Beverage preparation machine 100 may mix two or more ingredients, such as water and milk powder. Beverage preparation machine 100 may perform infusion of an ingredient, such as an infusion of ground coffee, or tea, with water. One or more of ingredients 122 may be supplied in loose form, in agglomerate powder form, in liquid form, and/or in a concentrate form. A carrier or diluents liquid (e.g. water) may be mixed with one or more ingredients to form the beverage. One or more ingredients may be inserted into beverage preparation machine 100 via beverage packet, which may, for example, be formed of an aluminum, plastic, or paper enclosure holding ingredient 122.

Beverage preparation machine 100 may include a water tank 103 accessible via a lid 102 on top of the apparatus 100. Beverage preparation machine 100 may include a container compartment 105 (e.g., package holder, package receiver, pack holder, etc.) for receiving a beverage mixing pack, such as beverage packet 120. Container compartment may have a door, such as door 104. Beverage preparation machine 100 may include an outlet, such as outlet 109 (FIG. 1) or outlet 153 (FIG. 2), for dispensing and/or holding a beverage and/or through which a beverage (e.g., liquid) may pass. Outlet 109/153 may be any known structure for dispensing and/or holding a beverage, such as a nozzle, spout, conduit, valve, tube, aperture, and the like. Outlet 109/153 may hold a beverage packet. In examples, outlet 109/153 may form part of the beverage packet itself. Outlet 109/153 may be configured to dispense one or more beverages flavored by one or more beverage packets, such as beverage packet 120.

Beverage preparation machine 100 may include a bin 106 which sits below the container compartment and receives beverage mixing packs after use. Bin 106 is received in a cavity formed in the beverage preparation machine 100 and is removed for emptying. A removable drip tray 108 is provided at the bottom of beverage preparation machine 100. The drip tray 108 includes a grill which forms a support surface for supporting a vessel (e.g., cup) when the apparatus 100 is dispensing a beverage into a vessel. A tray portion of the drip tray 108 is located beneath the grille for catching any spillage which passes through the grille. Beverage preparation machine 100 may have a user interface 110 in the form of a display screen, speakers, and such. Beverage preparation machine 100 may include a plurality of selection buttons 112. A user may interact with (e.g., control the function of) apparatus 100 via the user interface 110 and/or one or more of the selection buttons 112. For example, a user may select beverage making parameters via soft keys presented on the display and/or via the selection buttons 112.

As described herein, user interface 110 may be a display configured to display information to the user based on the user preference data. In other examples user interface 110 may be or may include a speaker, microphone, buttons, or one or more other elements for providing information to beverage preparation machine 100 or receiving information from beverage preparation machine 100. Information (e.g., personalized content) presented to the user may include favorite beverages of the user which are available for dispensing/purchase, sports content, stock content, weather content, advertisements targeted towards the user of beverage preparation machine 100, etc. Content provided to the user may include information that may brighten the mood of a user of beverage preparation machine 100. For example, beverage preparation machine 100 may provide fun facts via user interface and/or trivia/jokes that the user may enjoy. In examples beverage preparation machine 100 may provide information relating to the workplace of the user and/or wellness content (e.g., exercise information, nutrition information) that may be of interest to the user of beverage preparation machine 100.

Beverage preparation machine 100 may include a communication interface 126. Communication interface 126 may be configured to communicate (e.g., wirelessly communicate, communicate via wire) with one or more devices, such as a user device, a server, another beverage preparation machine, one or more Internet of Things (IOT) devices, etc. For example, communication interface 126 may comprise an antenna configured to communicate with one or more devices via NFC, Bluetooth, Wi-Fi, or other wireless technologies.

Figure 2:
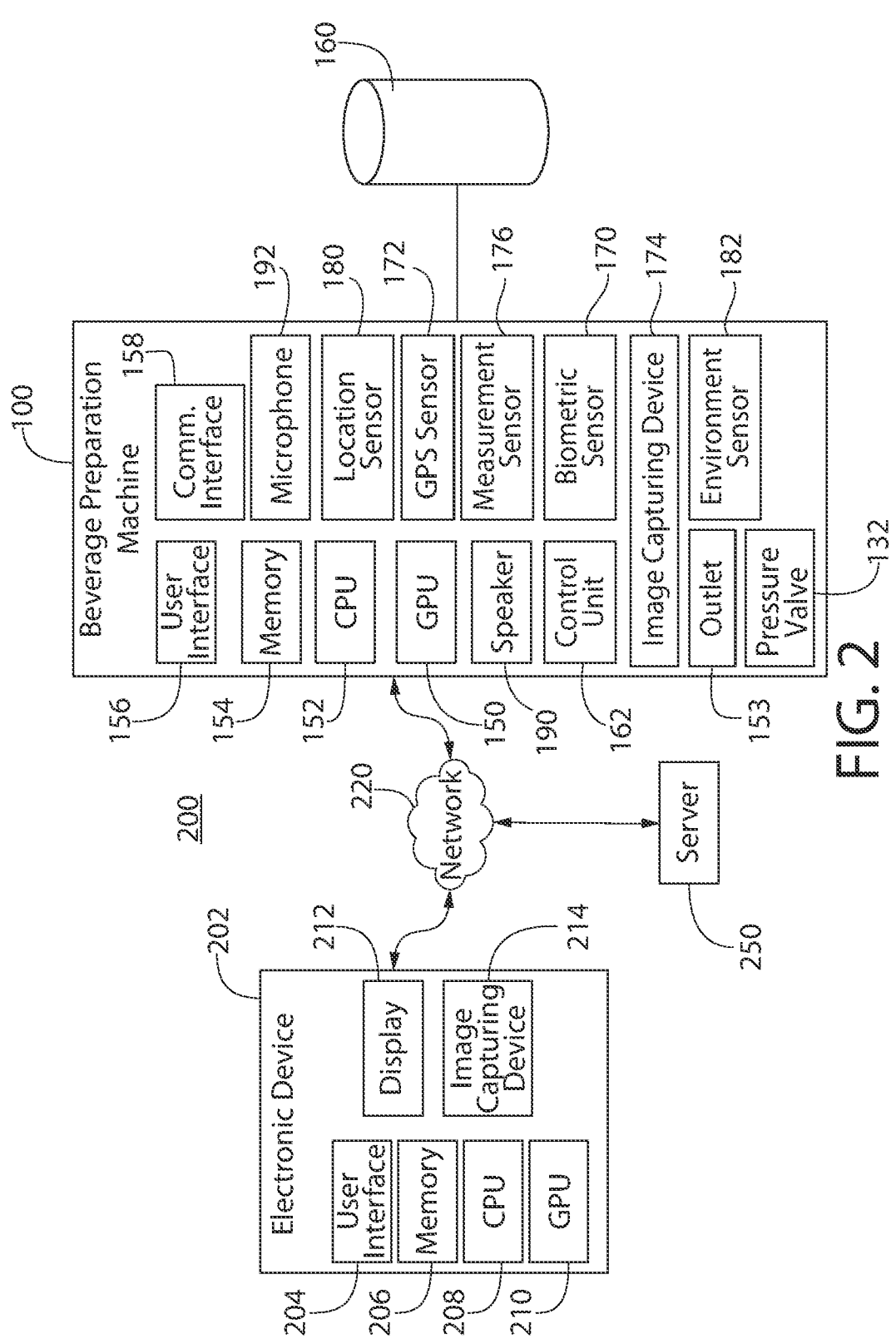
FIG. 2 is an example system diagram in which a user device communicates with an example beverage dispensing apparatus.

FIG. 2 is a block diagram of an example system 200 in which a beverage preparation machine 100 (FIG. 1) communicates with electronic device 202. Electronic device 202 may be one or more electronic devices, such as a mobile device (e.g., mobile phone or tablet) or Internet of Things device. In certain examples, the electronic device 202 may be server 250. One or more processes may be performed by beverage preparation machine 100 and/or electronic device 202. For example, beverage preparation machine 100 may perform one or more determinations described herein and/or server 250 may perform one or more determinations described herein. In examples in which server 250 performs one or more determinations, server 250 may provide the determinations to beverage preparation machine 100. Although FIG. 2 shows beverage preparation machine 100 communicating with a single electronic device 202 and a single server 250, it should be understood that this is for illustration purposes only and beverage preparation machine 100 may communicate with one or more electronic devices and one or more servers.

As shown on FIG. 2, beverage preparation machine 100 may include an outlet, such as outlet 153 (FIG. 2) or outlet 109 (FIG. 1), as described herein. Beverage preparation machine 100 may communicate with one or more servers 250 via network 220. Beverage preparation machine 100 may communicate with one or more databases, such as database 160, via network 220 or without network 220. Server 250 may communicate with beverage preparation machines 100 via a wireless signal or a wired signal. Server 250 may include a processor and a computer-readable medium (such as a random access memory (RAM)), coupled to the processor. The processor can execute computer-executable program instructions stored in memory. Computer executable program instructions can include any number of application programs.

As described herein, electronic device 202 may be any device that can communicate (e.g., electronically communicate) with beverage preparation machine 100. Beverage preparation machine 100 and electronic device 202 may communicate via a wire, wirelessly, via external devices (e.g., a USB device), and such. Example electronic devices 202 may include a user device (e.g. a smart phone, tablet, etc.), another beverage preparation machine, an Internet of Things (IOT) device, a server, etc. An IOT device may be any device that may transmit data to another device (or person) via the Internet, as understood by those of skill in the art. IOT devices may include sensors (e.g., wireless sensors), software, actuators, computer devices, and the like. Example IOT devices may include a smart light, door, key, refrigerator, cabinet, water system (such as water filtration system), thermometer and/or thermostat, GPS device, television, etc.

Beverage preparation machine 100 may communicate with one or more electronic devices 202 to provide information to electronic device 202 and/or to receive information from electronic device 202. The information provided from beverage preparation machine 100 to electronic device 202 may include information of the status of beverage preparation machine 100. Statuses may include fault statuses, power statuses, etc., of beverage preparation machine 100. For example, beverage preparation machine 100 may indicate to electronic device 202 that beverage preparation machine 100 is experiencing a fault and/or may experience a fault in the future. Beverage preparation machine 100 may identify the fault. For example, beverage preparation machine 100 may identify the fault via a name, a code (e.g., a code number), a type, a priority, a resolution, an estimated time to resolve, and the like. Beverage preparation machine 100 may notify a user that a fault exists via one or more communication methods, such as via SMS messaging, telephone, email, display (e.g., a message displayed on user interface 156 of beverage preparation machine 100), etc.

Beverage preparation machine 100 may take action (e.g., automatically take action) to correct a fault. For example, beverage preparation machine 100 may take action to correct the fault based on the permission and/or acknowledgement provided by the user. For example, upon detection of a fault, beverage preparation machine 100 may request permission from the user to correct the fault. In other examples, beverage preparation machine 100 may take action to correct the fault without requesting permission of the user, such as correcting the fault automatically. The user may indicate which faults may be corrected automatically, and which faults require acknowledgement and/or permission by the user. Beverage preparation machine 100 may identify methods to correct the fault. Beverage preparation machine 100 may indicate methods to correct the fault to the user of the beverage preparation machine 100, to a technician, etc.

Beverage preparation machine 100 may designate which faults can be corrected by a user, and which faults require a technician for correction. Beverage preparation machine 100 may notify one or more persons and/or entities of the status of beverage preparation machine 100, which may be designated during configuration of beverage preparation machine 100. For example, beverage preparation machine 100 may be configured to send fault information requiring a highly technical solution only to a technician and/or to send fault information requiring a less highly technical solution (e.g., such as a reboot of the machine) only to a user of the beverage preparation machine 100.

Beverage preparation machine 100 may provide (e.g., present to a user or a technician) actions that may correct the fault. Beverage preparation machine 100 may save (e.g., log) fault information, repair information, etc. in a database or another storage element, such as memory 154. For example, beverage preparation machine 100 may store information relating to the fault, the amount of time that the fault caused the beverage preparation machine 100 to be inoperable, the severity of the fault, the party that corrected the fault, and/or the method used to correct the fault. Although examples provided herein describe beverage preparation machine 100 providing information relating to beverage preparation machine 100, it should be understood that these examples are for illustration purposes only. Examples may include another device, such as server 250, providing information relating to beverage preparation machine 100.

Beverage preparation machine 100 may indicate (e.g., indicate to electronic device 202) the power status of beverage preparation machine 100, such as whether beverage preparation machine 100 is powered on, powered off, receiving power via a main source (e.g., an AC circuit), receiving a power from a backup source (e.g., via a DC circuit), etc. Beverage preparation machine 100 may indicate (e.g., indicate to electronic device 202) an inventory status of beverage preparation machine 100. For example, beverage preparation machine 100 may indicate the number of beverage packs in inventory and/or purchased, the number of beverage packs used, etc. Beverage preparation machine 100 may indicate when beverage packs should be repurchased, for example, based on the inventory information.

Beverage preparation machine 100 may provide information relating to the location and/or environment of the beverage preparation machine 100. Location information may be determined via location sensor 180, such as a GPS sensor 172, a geolocation sensor, and the like. Location information may include the GPS location of beverage preparation machine 100, geolocation information of beverage preparation machine 100, relative location information of beverage preparation machine 100, and the like. Location information of beverage preparation machine 100 may be determined via crowd sensing, in which locations of other (e.g., proximate to beverage preparation machine 100) devices update location information of beverage preparation machine 100. Location of beverage preparation machine 100 may be determined via geolocation methods. Geolocation may be used to determine the location of beverage preparation machine 100 within an area, such as within a building. For example, geolocation may be used to triangulate Wi-Fi signals within a building to determine a location within the building.

The location of beverage preparation machine 100 may be associated with a room, hallway, building, etc. For example, when the location of the beverage preparation machine 100 is determined (e.g., determined via geolocation, GPS, crowd sensing) within a building, the location of beverage preparation machine 100 within building can be associated with a room (e.g., conference room, break room, cafeteria, hallway, etc.). The location and/or association information may be provided to the electronic device 202, server 250, etc. In other examples the location information (e.g., latitude/longitude information, address information, association information, etc.) may be determined by a device external to beverage preparation machine 100 (such as server 250) and/or provided to electronic device 202 or another device.

Information relating to the environment in which beverage preparation machine 100 is located may be determined. Environment information may include temperature information of the environment in which beverage preparation machine 100 is located (e.g., temperature information of inside the building and/or outside the building in which the beverage preparation machine 100 is located), humidity information, precipitation information (e.g., sun, snow, rain, etc.), etc. Environment information may be determined via an environment sensor 182 within beverage preparation machine 100, such as a temperature sensor, humidity sensor, precipitation sensor, etc. Environment information may be determined externally from the beverage preparation machine 100, such as via server 250, via weather forecasting services, and the like.

Information relating to personal preferences (e.g., personal preferences of a user of the beverage preparation machine 100) may be determined. For example, coffee preference of a user may be determined. The coffee preferences may be based on day of week, a time of day, etc. Preferences may be determined via an input of a user, such as a user identifying her preference or beverage preparation machine 100 determining the preferences of the user via the beverage selections of the user. The beverage selections may be made from one or more days. For example, the user may select a beverage over a seven day period. Beverage preparation machine 100 may associate the beverage selections (e.g., over the seven day period) with the user. Beverage preparation machine 100 may list the beverage preferences, for example, from most desired beverage to least desired beverage.

Beverage preparation machine 100 may associate the beverage selections with the user via the user providing (e.g., physically providing, such as via user interface 156) the identity of the user. In other examples, beverage preparation machine 100 may associate the identity of the user via an electronic device 202 associated with the user. For example, when the user selects a beverage, beverage preparation machine 100 may determine the identity of the user by determining that the user's electronic device 202 is most proximate to beverage preparation machine 100 when the beverage is selected. Beverage preparation machine 100 may provide identity protections of user of beverage preparation machine 100, for example, such that the name of a user may be protected. Such protections may include a user being associated with a unique code (and not the name of the user). In other examples beverage preparation machine 100 may aggregate two or more users and mask the users so that the users obtain a level of anonymity.

As described herein, beverage preparation machine 100 may associate a user via electronic device 202 of the user. Beverage preparation machine 100 may receive information relating to one or more users (e.g., users of the beverage preparation machine 100), for example, via electronic device 202. Based on information provided on user's electronic device 202, beverage preparation machine 100 may receive calendar information of one or more users. Beverage preparation machine 100 may determine the dates, times, types (e.g., business, personal), and/or duration of events based on the user's calendars. Events may include business/personal meetings, times of arrival/departures, etc.

Beverage preparation machine 100 may determine the type of day a user is having based on the user's calendar information. For example, the beverage preparation machine 100 may determine whether the user is expected to have a busy day, a stressful day, a short/long day, etc., based on the number of meetings scheduled for the user and/or participants of the meetings. Beverage preparation machine 100 may suggest beverages to one or more users based on the type of day a user is expected to have (e.g., predicted to have). For example, beverage preparation machine 100 may identify a beverage that may relax a user that is expected to have a stressful day, a beverage that may focus a user expected to meet with those that user reports to, a beverage that may energize a user expected to have a long day, and the like.

Artificial Intelligence techniques, such as machine learning techniques, may be used to determine the type of day a user is determined (e.g., predicted) to have. For example, beverage preparation machine 100 may determine that a user will have back to back meetings. Based on artificial intelligence techniques, the beverage preparation machine 100 may determine the user may be tired, mentally exhausted, etc., and would benefit from functional beverages (e.g., beverages with caffeine, beverages with green tea, beverages with electrolytes, etc.). The beverage preparation machine 100 may suggest beverages to keep a user awake, to relieve and/or destress the stress incurred by a user, to energize the user, etc. The beverage preparation machine 100 may dispense (e.g., automatically dispense, or brew) beverages determined to be beneficial to a user, in some examples.

In other examples, beverage preparation machine 100 may activate a vending display mode when a user is proximate to beverage preparation machine 100. The vending display mode may display elements used by a user in selecting a beverage and/or may suggest a beverage to the user of beverage preparation machine 100, for example, via a user interface.

Beverage preparation machine 100 may determine that a user is proximate via a proximity sensor, via a beacon signal, etc. Beverage preparation machine 100 may determine other eating and/or drinking actions that may be beneficial to a user. For example, the beverage preparation machine 100 may recommend that the user drink an amount of water (e.g., if the user has consumed a lot of coffee), as coffee is a known diuretic and multiple coffees can be known to cause dehydration. The recommendation may be provided via beverage preparation machine 100 when the user is proximate, in examples. In other examples, beverage preparation machine 100 may indicate to user (e.g., via reminders) that user should drink certain beverages through electronic device 202 of user. For example, beverage preparation machine 100 may send an SMS message to user, via electronic device 202, that it is time for the user's afternoon coffee, that the user should drink water, etc.

As shown in FIG. 2 and described herein, system 200 includes electronic device 202 communicating with beverage preparation machine 100 via a network 220. Network 220 may be the Internet, in some examples. In other examples, network 220 may be Wi-Fi, Bluetooth, LAN, etc. Network 220 may include one or more wired and/or wireless communication networks. For example, electronic device 202 (such as a user device and/or IOT device) may communicate with the beverage preparation machine 100 via a Bluetooth protocol upon the electronic device 202 being located within a predefined distance of the beverage preparation machine 100. Electronic device 202 may communicate with beverage preparation machine 100 based on a user command and/or electronic device 202 may communicate with beverage preparation machine 100 automatically. For example, electronic device 202 may automatically communicate with beverage preparation machine 100 based on a schedule (e.g., every 1 hour), based on electronic device 202 and beverage preparation machine 100 being proximate to one another (e.g., within a predefined location of one another), based on an event (e.g., a scheduled meeting), etc.

As shown on FIG. 2, electronic device 202 may include a user interface 204, a memory 206, a central processing unit (CPU) 208, a graphics processing unit (GPU) 210, an image capturing device 214, and/or a display 212. User interface 204 may allow a user to interact with electronic device 202. In examples user interface 204 may be a display. For example, user interface 204 may be a display that includes soft keys for providing information to the user. In examples user interface 204 may include hard keys or no keys at all (e.g., user interface 204 may be a display, such as display 212. In other examples user interface 204 may be an external hardware keyboard configured to communicate with IOT device 204 via a wired or a wireless connection (e.g., a Bluetooth keyboard), an external mouse, or any other user-input device.

Memory 206 may store instructions executable on the CPU 208 and/or the GPU 210. The instructions may include machine readable instructions that, when executed by CPU 208 and/or GPU 210, cause the CPU 208 and/or GPU 210 to perform various acts. Memory 206 may store instructions that when executed by CPU 208 and/or GPU 210 cause CPU 208 and/or GPU 210 to enable user interface 204 to interact with a user. For example, executable instructions may enable user interface to display (via Display 212) one or more prompts to a user, and/or accept user input. Instructions stored in memory 206 may enable a user to select a type of beverage (e.g. coffee) to be dispensed from beverage preparation machine 100, for example. A user may utilize user interface 204 to schedule a future brewing of coffee by selecting the type of coffee to be brewed, as well as the date and time of brewing. In other examples, a user may utilize user interface 204 to click, hold, or drag a cursor to define one or more coffee brewing parameters (e.g., temperature, ounces to be dispensed, etc.).

CPU 208 and/or GPU 210 may be configured to communicate with memory 206 to store to and read data from memory 206. For example, memory 206 may be a computer-readable non-transitory storage device that may include any combination of volatile (e.g., random access memory (RAM)) or non-volatile (e.g., battery-backed RAM, FLASH, etc.) memory. Image capturing device 214 may be configured to capture an image. The image may be an identifier of beverage preparation machine 100, such as a serial number associated with beverage preparation machine 100 or a QR code associated with beverage preparation machine 100.

System 200 includes beverage preparation machine 100. As shown in FIG. 2, beverage preparation machine 100 may include a CPU 152, memory 154, GPU 150, user interface 156, communication interface 158, and image capturing device 174. As described herein, CPU 152 and/or GPU 150 may form a processor, either alone or in combination with a microprocessor, micro-controller, computational, programmable device, or circuit.

Memory 154 may be configured to store instructions executable on the CPU 152 and/or the GPU 150. The instructions may include machine readable instructions that, when executed by CPU 152 and/or GPU 150, cause the CPU 152 and/or GPU 150 to perform various acts. CPU 152 and/or GPU 150 may be configured to communicate with memory 154 to store to and read data from memory 154. For example, memory 154 may be a computer-readable non-transitory storage device that may include any combination of volatile (e.g., random access memory (RAM)) or a non-volatile memory (e.g., battery-backed RAM, FLASH, etc.) memory.

User interface 156 may be configured to allow a user of beverage preparation machine 100 to interface with beverage preparation machine 100. For example, user interface 156 may include a user-input device such as an interactive portion of display 110 (e.g., "soft" key displayed on display 110), selection buttons 112, an external hardware keyboard configured to communicate with beverage preparation machine 100 via a wired or a wireless connection, an external device, or any other user-input device.

Communication interface 158 may be configured to enable beverage preparation machine 100 to communicate (e.g., interface) with one or more devices internal or external to beverage preparation machine 100. For example, communication interface 158 may be configured to enable beverage preparation machine 100 to interface with electronic device 202, one or more other electronic devices (such as one or more other beverage preparation machine 100), and/or beverage dispensing database 160. Beverage dispensing database 160 may store information relating to coffee consumption, such as a user's coffee preferences, locations of beverage preparation machine 100, etc. The information stored within beverage dispensing database 160 may be used to provide coffee experiences that are unique to one or more users of beverage preparation machine 100.

Image capturing device 174 may be configured to capture an image. The image may be an identifier of beverage preparation machine 100 and/or vessel receiving a beverage from beverage preparation machine 100 (such as a serial number or a QR code associated with beverage preparation machine 100 and/or vessel). The image may be an identifier of vessel, such as a cup, mug, or other container for holding a beverage. The image may be a shape of vessel. Image capturing device 174 may be configured to capture images of previously brewed beverage, for example, so that the beverage preparation machine 100 can emulate the image of the previously brewed beverage. As an example, beverage preparation machine 100 may attempt to brew coffee according to a color (e.g., having a defined amount of sugar or cream), fill amount, etc., based on the image. Image capturing device 174 may be configured to take an image of a beverage to identify the name of the beverage, the ingredients of the beverage, the brew time, as well as other parameters of the beverage (e.g., such as the temperature at which the beverage is to be brewed).

Image capturing device 174 may be configured to capture an image external to a vessel and/or internal to a vessel. For example, image capturing device 174 may be configured to capture an image of an interior of a vessel so that the image can be used to determine an internal volume of the vessel. For example, one or more elements (e.g., processor, server, measurement sensor 176, and/or control unit 162) may determine the volume of the interior of the vessel based on the image of the interior of the vessel. Image capturing device 174 may be configured to capture an image in a digital format having a number of pixels.

Although image capturing device 174 is illustrated in FIG. 2 as internal to beverage preparation machine 100, in other examples image capturing device 174 may be internal and/or external to beverage preparation machine 100. For example, image capturing device 174 may be implemented as a camera coupled to electronic device 202. Image capturing device 174 may be implemented as a webcam coupled to electronic device 202 and configured to communicate with electronic device 202. Image capturing device 214 may be implemented as a digital camera configured to transfer digital images to electronic device 202 and/or to beverage preparation machine 100. Such transfers may occur via a cable, a wireless transmission, network 220, and/or a physical memory card device transfer (e.g., SD Card, Flash card, etc.), for example.

Beverage preparation machine 100 may include a control unit, such as control unit 162. Control unit 162 may be configured to control one or more beverage operations of beverage preparation machine 100. Control unit 162 may be configured to control a brewing of beverage preparation machine 100 based on an input received from communication interface 158 and/or user interface 156. In examples control unit 162 may be located internal to beverage preparation machine 100 and/or external to beverage preparation machine 100.

Figure 3:
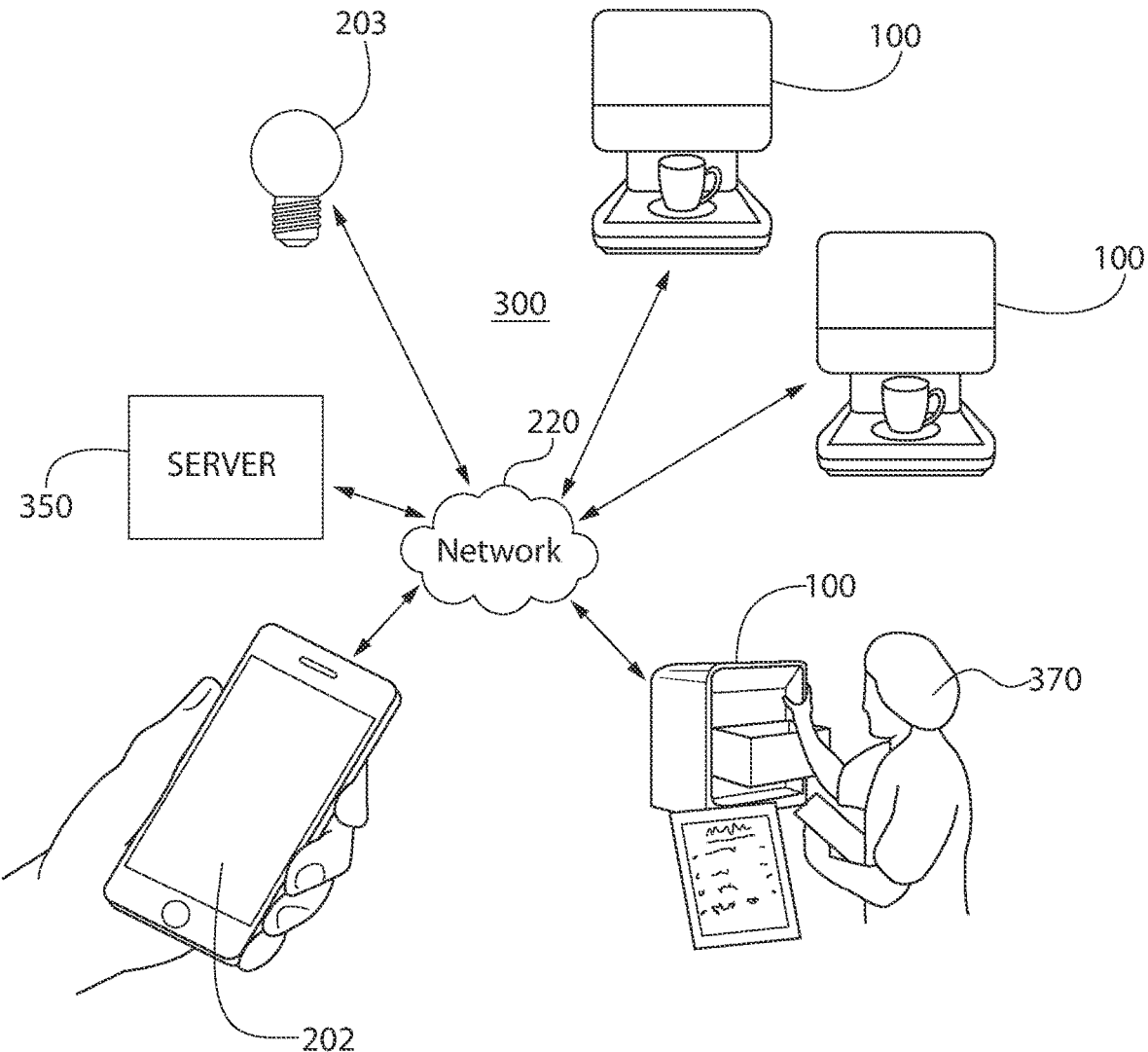
FIG. 3 is another example system diagram in which a beverage preparation machine communicates with one or more devices, such as a server, mobile device, and another beverage preparation machine.

FIG. 3 is an example system 300 including one or more beverage preparation machines 100 and/or one or more electronic devices 202. As shown on FIG. 3, beverage preparation machines 100 may communicate with an IOT device, such as lighting device 203 System 300 may include one or more servers 350 communicating with one or more beverage preparation machine 100. Servers 350 may be configured with an operating system which may run one or more applications. The applications may be configured to provide services to the beverage preparation machine 100 and/or one or more of the electronic devices 202. Server 350 may be a data server, a web server, a cloud computing device, or the like. System 300 may include one or more users 370 (e.g., beverage drinkers, maintainers of beverage preparation machine 100, etc.) of beverage preparation machine 100. Beverage preparation machine 100, electronic devices 202 (such as a user device), and/or server 350 may communicate with one another via a network, such as network 220.

A user 370 may interact with beverage preparation machine 100 in one or more ways. For example, a user may interact with beverage preparation machine 100 to receive a beverage and/or content from beverage preparation machine 100, to provide input (e.g., stock information, content information, fault information, etc.) to beverage preparation machine 100, etc. In such examples, user 370 may interact with beverage preparation machine 100 to request maintenance of the beverage preparation machine 100, request cleaning of the beverage preparation machine 100, request stocking of supplies necessary for the use of beverage preparation machine 100, etc. The user may interact with beverage preparation machine 100 using one or more electronic devices, via physically actuating buttons (soft keys on display 112 or actual keys) on the beverage preparation machine 100, etc. For example, user 370 may request maintenance, cleaning, stocking, etc., of beverage preparation machine 100 using one or more electronic devices, via physically actuating buttons on the beverage preparation machine 100, etc.

Wrong pack tolerance may be provided. As described herein, beverage dispensing apparatus 100 may be configured to accept one or more types of packs (e.g., beverage mixing packs). The packs may include ingredients mixed with a liquid (e.g., water) for producing the beverage. Different pressures may be enacted upon the ingredients to produce different beverages. For example, beverage dispensing apparatus 100 may be configured to accept a high-pressure pack and/or a low-pressure pack. High pressure packs may be used to create beverages such as cappuccino, and low-pressure packs may be used to create beverages such as coffee (which may require a slow drip of water to drip over coffee grounds).

Figure 4:
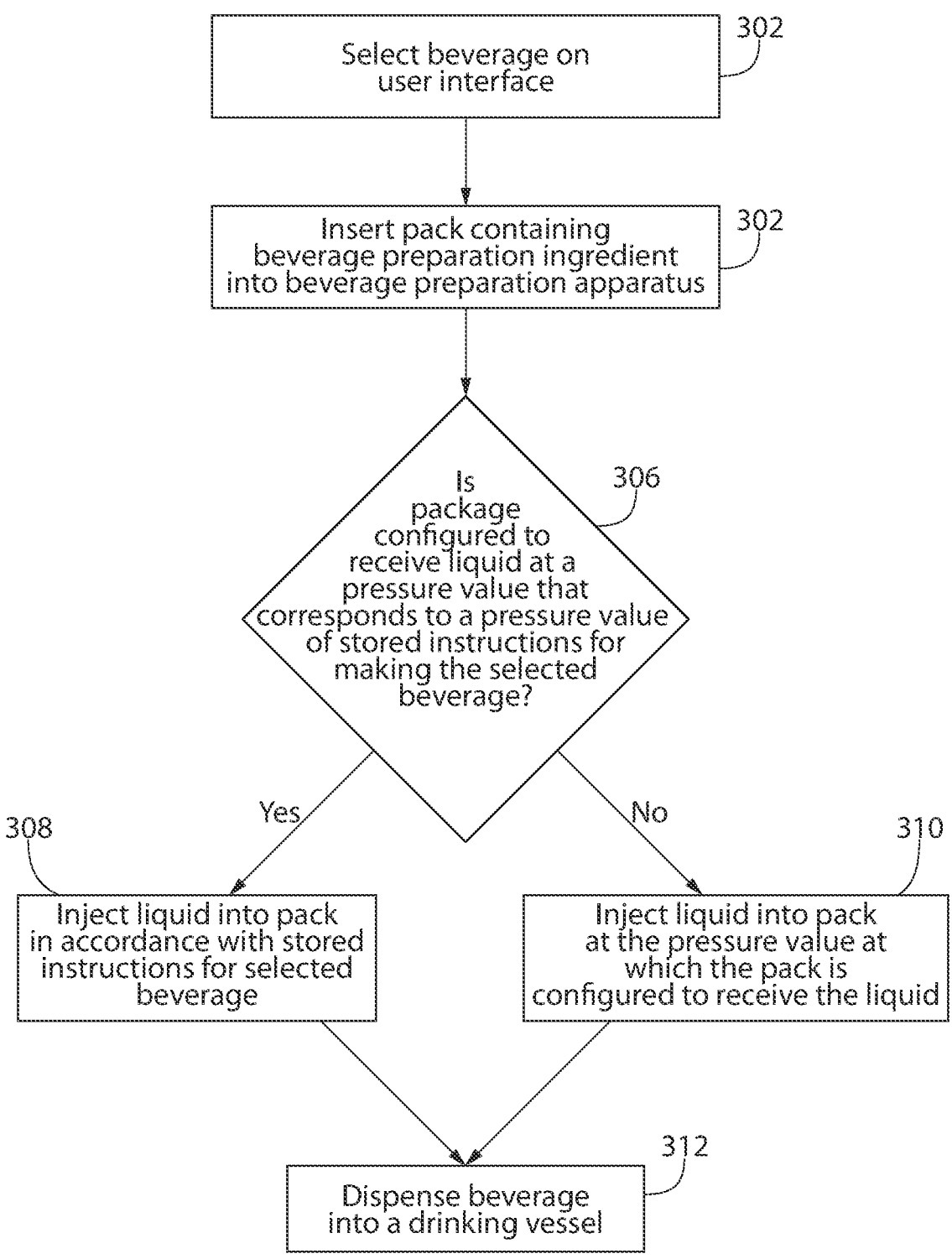
FIG. 4 is an example process in which a beverage dispensing apparatus receives a beverage selection.

FIG. 4 shows an example process in which the beverage dispensing apparatus 100 receives a beverage selection that may be inconsistent with the pack provided to the beverage dispensing apparatus 100. Although FIG. 4 focuses on an inconsistency with respect to the pressure of the selected beverage and the pressure associated with the pack provided to the beverage dispensing apparatus 100, such inconsistency is for illustration purposes only and it should be understood that the beverage dispensing apparatus 100 may be configured to handle one or more other types of inconsistencies.

At 302, a user may select a desired beverage, for example, via the beverage dispensing apparatus 100. As an example, a user may select a desired beverage (e.g., a cappuccino) via one or more selection buttons 112 or via a graphical user interface (e.g., soft buttons of a graphical user interface). The beverage dispensing apparatus 100 may have instructions for producing the selected beverage. The instructions may include a pressure value, such as a beverage pressure value of the selected beverage.

At 304, a user may provide (e.g., insert) a beverage mixing pack to the beverage dispensing apparatus 100, for example, into the pack holder of the beverage dispensing apparatus 100. The beverage mixing pack may include beverage preparation ingredients. The beverage mixing pack may have a type, such as a beverage type produced via the beverage mixing pack.

The beverage dispensing apparatus 100 may determine the type associated with the received beverage mixing pack and/or the value (e.g., beverage package pressure value) associated with the received beverage mixing pack. The beverage dispensing apparatus 100 may determine whether the beverage (e.g., beverage type) selected by the user is consistent with the beverage mixing pack (e.g., beverage mixing pack type) provided to the beverage dispensing apparatus 100. For example, the beverage dispensing apparatus 100 may determine whether the value (e.g., beverage pressure value) associated with the selected beverage is consistent with the value (e.g., beverage package pressure value) associated with the received beverage mixing package.

For example, at 306 the beverage dispensing apparatus 100 may determine whether the beverage selected by the user is associated with a value (e.g., beverage pressure value) that is consistent with the value (e.g., beverage package pressure value) of the pack provided to the beverage dispensing apparatus 100. In some examples the selection provided by the user may relate to (e.g., may be consistent with) the pack provided to the beverage dispensing apparatus 100. For example, if the selection provided by the user is consistent with the pack provided to the beverage dispensing apparatus 100, the beverage dispensing apparatus 100 may inject liquid into the pack. The beverage dispensing apparatus 100 may inject liquid into the pack in accordance with instructions (e.g., in accordance with the beverage pressure value) for the selected beverage, as shown at 308.

In other examples, the selection provided by the user may not relate (e.g., may be inconsistent with) the pack provided to the beverage dispensing apparatus 100. For example, if the beverage dispensing apparatus 100 determines that the beverage pressure value that the beverage dispensing apparatus 100 associates with the selection provided by the user is inconsistent with the beverage package pressure value provided by the beverage mixing pack, the beverage dispensing apparatus 100 may inject liquid into the pack. The beverage dispensing apparatus 100 may inject liquid into the pack at a pressure at which the pack is configured to receive the liquid, such as at the beverage package pressure value, at 310. The pressure at which the pack is configured to receive the liquid may be different than the pressure at which the beverage dispensing apparatus 100 previously determined the pressure to be. For example, the pressure at which the pack receives the liquid may relate to a beverage previously selected by a user of the beverage dispensing apparatus, a popular beverage, etc. The beverage dispensing apparatus 100 may dispense the liquid at that pressure, at 312.

The beverage dispensing apparatus 100 may perform one or more actions (e.g., other actions) when the beverage pressure value determined by the beverage dispensing apparatus 100 (or selected by the user) is inconsistent with the beverage package pressure value associated with the beverage mixing pack provided to the beverage dispensing apparatus 100. For example, the beverage dispensing apparatus 100 may provide an indication of the inconsistency, such as a visual indication (e.g., via display screen 110), an audio indication (e.g., a beep), or the like. The beverage dispensing apparatus 100 may audibly provide the indication via speakers 134. In examples the beverage dispensing apparatus 100 may provide (e.g., display) one or more options for how the beverage dispensing apparatus 100 may address the selection provided by the user being inconsistent with the pack provided to the beverage dispensing apparatus 100. In such examples the user may select an option, the beverage dispensing apparatus 100 may determine (e.g., automatically determine) an option, etc. The beverage dispensing apparatus 100 may automatically determine the option based on a timer, such as if the user does not select an option with a predetermined time.

As provided herein, the beverage dispensing apparatus 100 may create/produce a beverage when the selection provided by the user is inconsistent with the pack provided to the beverage dispensing apparatus 100. As another example, the beverage dispensing apparatus 100 may create/produce a beverage based on a trend. The beverage dispensing apparatus may produce a popular (e.g., the most popular) beverage based on the selection of the user and/or the pack provided by the user. For example, the beverage dispensing apparatus 100 may determine the beverage to produce based on the selection of the user, the pack provided, and/or previous selections (e.g., selections by the particular user, users with similar tastes as the user, etc.). The beverage dispensing apparatus 100 may determine the beverage to produce based on the selection of the user, the pack provided, user surveys, research (e.g., digital research, for example, based on an internet search), and the like.

The beverage dispensing apparatus 100 may determine the beverage to produce based on artificial intelligence. For example, based on the ingredients housed within the provided pack and/or the selected beverage, the beverage dispensing apparatus 100 may determine which beverage is producible using the supplied pack. As an example, the beverage selection may have a particular taste. Artificial intelligence methods (such as machine learning methods) may be used to determine one or more beverages producible (e.g., producible with the supplied pack) that are similar (e.g., have a similar taste) as the beverage selected by the user. For example, a model may be trained by one or more users of one or more beverage dispensing apparatus 100. The model may be trained on a periodic basis, such as on a daily, weekly, monthly, basis. The users may input into the model one or more packs that produce a taste that is similar to one or more other packs. The similar packs may be accessible by one or more beverage dispensing apparatuses 100 via a network, such as network 220.

The beverage dispensing apparatus 100 may be configured to ensure that the beverage determined to be produced by beverage dispensing apparatus 100 is produced in a safe manner. For example, it may be unsafe to produce a high-pressure beverage using a low-pressure pack. The beverage dispensing apparatus 100 may determine beverages that are producible by the pack provided by the user that are also consistent with (e.g., have a consistent taste of) the user's selection. The beverage dispensing apparatus 100 may also, or alternatively, determine that the beverages having the consistent taste are safe for producing.

As provided herein, the beverage dispensing apparatus 100 may provide an indication that the user's selection is inconsistent with the supplied pack. Providing an indication of the inconsistency will alleviate confusion of the user. In addition to providing an indication of the inconsistency, the beverage dispensing apparatus 100 may provide an indication of beverages that may be produced with the packs. For example, the beverage dispensing apparatus 100 may display one or more beverages that are consistent with the provided pack (e.g., the pack provided by the user that is inconsistent with the user's selection). The user may select a beverage from the display screen 110 using one or more buttons 112, a graphical user interface, and the like. Based on the selected beverage the beverage dispensing apparatus 100 may display (e.g., only display) beverages that are safe for producing.

As described herein, the beverage dispensing apparatus 100 may produce a beverage even if the beverage selected by the user to be produced differs from the pack provided to the beverage dispensing apparatus 100. For example, for a selection of Cappuccino and/or Americano coffee, the pack expected to be provided to the beverage dispensing apparatus 100 would be a high-pressure espresso pack. If a Cappuccino drink is selected and a low-pressure coffee pack is inserted as the pack, the beverage dispensing apparatus 100 may brew a filter coffee. In another example, if an Americano is selected and a low-pressure coffee pack is inserted, the beverage may be vended as a normal coffee. As a result, the beverage produced by the beverage dispensing apparatus 100 may be a drink that may be similar (e.g., similar to the definitions adopted by the appliance) being vended.

As described herein, a beverage selection may be input via a user interface, such as display 110. For example, a beverage may be selected from soft buttons on a menu (such as a beverage menu). A pack may be inserted into the beverage dispensing apparatus 100. The package may contain ingredients, such as beverage preparation ingredients. The beverage dispensing apparatus 100 may detect a type of the inserted package, an identity of the package, ingredients provided with the package, beverages that are producible via the package, etc. The type of the inserted package may include a pressure (e.g., high-pressure, low-pressure) of the pack, a flavor of the pack, an expiration date of the pack, a popularity of the pack (e.g., popular beverages that may be produced from the ingredients provided in the pack, etc.).

The beverage dispensing apparatus 100 may include a beverage pressure valve, such as pressure valve 132. The pressure valve 132 may be used to produce one or more (e.g., different) pressure beverages. For example, the pressure valve 132 may be used to produce a high-pressure beverage and/or a low-pressure beverage. The pressure valve 132 may be set based on the pressure used for a beverage. For example, the beverage pressure valve 132 may be set to a high pressure setting if a high-pressure beverage is to be produced. The beverage pressure valve 132 may be set to a low pressure setting if a low-pressure beverage is to be produced. The beverage dispensing apparatus 100 may monitor the setting of the beverage pressure valve 132. The beverage dispensing apparatus 100 may monitor the setting of the beverage pressure valve 132 via a beverage pressure detector (e.g., a beverage pressure sensor, such as pressure sensor 130). For example, the beverage dispensing apparatus 100 may determine the setting of the pressure valve 132 prior to producing a beverage. The beverage dispensing apparatus 100 may determine (e.g., ensure) that the setting of the pressure valve 132 is consistent with the beverage to be produced. The beverage dispensing apparatus 100 may determine (e.g., ensure) that the setting of the pressure valve 132 results in the beverage dispensing apparatus 100 safely produces a beverage, as described herein.

As described herein, if the setting of the pressure valve 132 is not consistent with the beverage to be produced (e.g., beverage to be produced based on the pack provided to the beverage dispensing apparatus 100), one or more actions may be performed. For example, if the setting of the pressure valve 132 is not consistent with the beverage to be produced, an indication may be provided to the user, a beverage (e.g., beverage consistent with the pack provided) may be produced, etc. In examples a beverage may be consistent with the pack provided if the beverage tastes similar to the pack provided, has a pressure (e.g., high/low pressure) that is similar to the pack provided, as well as one or more other parameters that are similar to the pack provided.

The beverage dispensing apparatus 100 may determine a beverage pressure (e.g., beverage pressure value) based on the pack (e.g., inserted beverage package). The beverage dispensing apparatus 100 may determine if the package pressure value corresponds to the beverage pressure value. As described herein, if the package pressure value corresponds to the beverage pressure value, the beverage dispensing apparatus may provide (e.g., inject) a liquid to the inserted package. The beverage dispensing apparatus may provide (e.g., inject) a liquid to the inserted package at the beverage pressure value. The beverage pressure value may correspond with the beverage pressure suggested (e.g., recommended or required) for the pack. The suggested beverage pressure may be provided via instructions on the pack, via instructions received remotely (e.g., via a server, a user device, etc.), via instructions stored on the beverage dispensing apparatus, etc. The instructions may relate to the pressure suggested (e.g., recommended or required) to make the beverage selected by the user. In other examples, the instructions may relate to the pressure suggested (e.g., recommended or required) to make the beverage associated with the pack provided by the user.

As described herein, the beverage selected by the user may not require (e.g., use) the same pressure associated with the pack provided by the user. If the pressure suggested (e.g., required) by the pack does not correspond to the pressure of the beverage selected by the user, the beverage dispensing apparatus 100 may modify the beverage to be made. For example, the beverage dispensing apparatus 100 may produce a beverage that differs from the beverage selected by the user. In such an example the beverage dispensing apparatus 100 may provide (e.g., inject) liquid into the inserted package at a pressure suggested (e.g., recommended or required) by the pack provided by the user. The pressure suggested (e.g., required) by the pack may produce a beverage that is different than the beverage selected by the user. The pressure suggested (e.g., required) by the pack may produce a beverage that is consistent with the pack provided by the user. The beverage dispensing apparatus 100 may dispense the beverage that is consistent with the pack provided by the user.

As described herein, the beverage dispensing apparatus 100 may produce a beverage that is consistent with the pressure suggested (e.g., required) by the pack provided by the user. The beverage dispensing apparatus 100 may produce a drink that is consistent with the requirements of the pack (e.g., pressure requirements) provided by the user and that is related to the beverage selected by the user. For example, the beverage dispensing apparatus 100 may produce a beverage that is consistent with the pack provided by the user and that is related to a flavor, blend, or other category of the beverage selected by the user. The beverage dispensing apparatus 100 may produce a beverage that is consistent with the pack provided by the user and that is related (and not exactly the same) as the beverage selected by the user without providing an indication to the user, in examples.

The beverage dispensing apparatus 100 may provide an indication that the beverage dispensing apparatus 100 may produce a beverage that is consistent with requirements (e.g., pressure requirements) of the pack and that is different (related, not exactly the same, etc.) as the beverage selected by the user. The beverage dispensing apparatus 100 may allow the user to select one or more choices of beverages that may relate to requirements (and not be exactly the same as) the beverage selected by the user. The beverage dispensing apparatus 100 may allow the user to input another beverage, for example, via a text box, via a user device, a voice, etc. The beverage dispensing apparatus 100 may allow the user to terminate the beverage dispensing apparatus 100 from making a beverage that is different than the selected beverage. In such example the beverage dispensing apparatus 100 may attempt to produce the beverage selected by the user via the pressure suggested (e.g., required) by the pack. The beverage dispensing apparatus 100 may produce the beverage (e.g., the modified beverage) selected by the user.

Smart drink menu customization may be provided. Beverage dispensing apparatus 100 may be configured to determine beverages that may be produced (e.g., beverage options). For example, the beverage dispensing apparatus 100 may be configured to determine beverages that may be produced based on the pack (e.g., beverage pack, beverage preparation ingredient package, etc.) provided to the beverage dispensing apparatus 100. The beverage dispensing apparatus 100 may determine beverages that may be produced based on an identification of the packs, such as via a bar code, QR code, image, name, etc. provided on the pack. Beverage dispensing apparatus 100 may determine (e.g., automatically determine) the beverage to be produced based on the identification of the pack. The beverage dispensing apparatus 100 may determine the beverage to be produced based on the user's history of beverage consumption, beverage consumption of others (e.g., popular beverages being produced for and/or consumed by others), the weather (e.g., hot, cold, rainy, sunny) in which the beverage dispensing apparatus 100 is located. The beverage dispensing apparatus 100 may produce a beverage of one or more blends based on artificial intelligence (e.g., machine learning), based on chemistry (e.g., one or more ingredients may be thought to chemically blend well together, based on a random assortment), etc.

The beverage dispensing apparatus 100 may provide an indication of the beverage to be produced and/or the beverage dispensing apparatus 100 may provide an indication of options (e.g., via a menu) of beverages that may be produced. The options may be provided (e.g., customized) based on an availability status of beverage preparation ingredient package types located proximate to beverage dispensing apparatus 100. The availability status may include whether beverage preparation ingredient package types are in-stock and/or whether the beverage preparation ingredient package types are out-of-stock. An in-stock status of beverage preparation ingredient package types may include beverage preparation ingredient package types that are located proximate to beverage dispensing apparatus 100 and/or that are offered by the beverage preparation ingredient package types. An out-of-stock status of beverage preparation ingredient package types may include beverage preparation ingredient package types that are not located proximate to beverage dispensing apparatus 100 (e.g., out-of-stock). In other examples an out-of-stock status of beverage preparation ingredient package types may include beverage preparation ingredient package types that are in-stock but are not offered by the beverage preparation ingredient package types. For example, although a beverage preparation ingredient package types may be available for use by the beverage dispensing apparatus, the beverage dispensing apparatus may be programmed not to offer the beverage preparation ingredient package types when producing and/or dispensing beverages.

The beverage dispensing apparatus 100 may provide the availability status (e.g., in-stock, out-of-stock indication) via a display/speaker on beverage dispensing apparatus 100, via a user device, etc. The beverage dispensing apparatus 100 may provide the indication after a pack is provided (e.g., inserted) to the beverage dispensing apparatus 100. In examples, beverage dispensing apparatus 100 may provide the indication prior to a pack being provided (e.g., inserted) to the beverage dispensing apparatus 100, for example, via the user providing an identification of the pack prior to the pack being provided to the beverage dispensing apparatus 100.

FIG. 5 shows an example process for updating a menu (e.g., a beverage menu) based on an inventory of ingredients. The beverage dispensing apparatus 100 may provide an indication of the beverage(s) to be produced based on one or more packs (e.g., ingredients) corresponding to the beverage being present. At 402, the beverage dispensing apparatus 100 may provide an indication of the beverage(s) to be produced based on an indication of one or more packs (e.g., ingredients) being available (e.g., in stock) and/or unavailable (e.g., out of stock). The beverage dispensing apparatus 100 may determine whether the pack (e.g., ingredients) is available (e.g., in stock) and/or unavailable (e.g., out of stock) via a local indication and/or a remote indication. An example of a local indication of the pack being in stock may include a supplier/consumer of the pack indicating that the pack is in (or out of) stock, a sensor of the beverage dispensing apparatus 100 determining that the pack is in and/or out of stock (e.g., via a bar code, QR code, etc. of the pack, etc.). An example of a remote indication of the pack being in stock may include the beverage dispensing apparatus 100 receiving inventory notices/updates via a remote server, such as sever 260 (e.g., a cloud server). A remote server may determine inventory of the pack (e.g., ingredients) based on the server updating the inventory of the pack(s) when the pack(s) are added to inventory, consumed, removed from stock (e.g., due to the pack(s) being poor sellers, expiring), etc.

At 404, the beverage dispensing apparatus 100 may provide an indication of packs that are in stock. For example, the beverage dispensing apparatus 100 may provide a beverage menu based on the packs that are in stock. The beverage dispensing apparatus 100 may provide a beverage menu based on the ingredients available (e.g., in stock). The beverage dispensing apparatus 100 may continue to determine whether one or more packs are in stock or out of stock. For example, the beverage dispensing apparatus 100 may determine whether one or more packs are in stock based on a period (e.g., every 10 minutes, 1 hour, 1 day, etc.). The beverage dispensing apparatus 100 may determine whether the packs are in stock via a user input and/or via a sensor, such as a barcode sensor, QR code sensor, an optical camera, etc. At 406, beverage dispensing apparatus 100 may receive a pack that was determined (e.g., previously determined) to be out of stock. Beverage dispensing apparatus 100 may update the status of a pack. For example, a pack may be determined (e.g., marked) as out of stock and the beverage dispensing apparatus 100 may subsequently determine (e.g., subsequently determine) that the pack is in stock, for example, via a reading of a bar code of a pack (e.g., an inserted pack). At 408 a beverage menu may be updated (e.g., permanently updated) to include the inserted pack. For example, the beverage menu may be updated to include beverages that may be produced via the inserted pack.

Figure 6A:
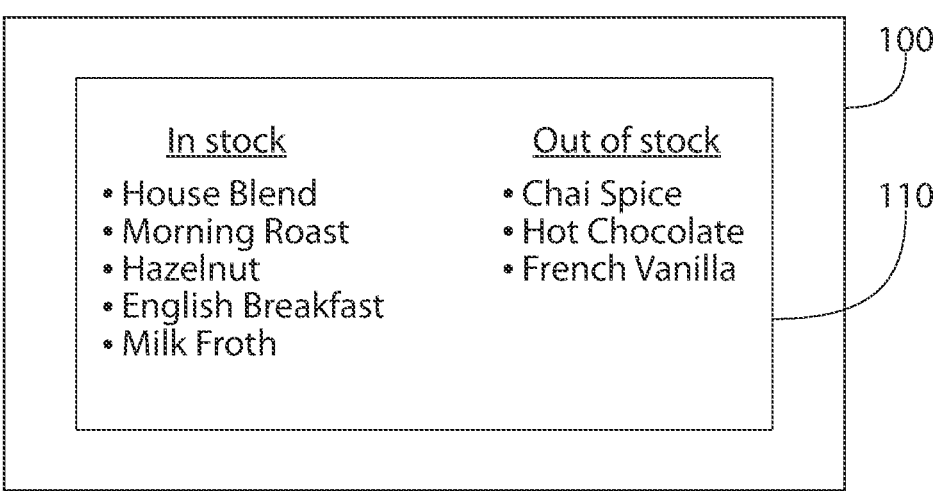
FIGS. 6A-6D are example user interfaces in which beverage dispensing apparatus determines that a beverage pack is in stock.
Figure 6B:
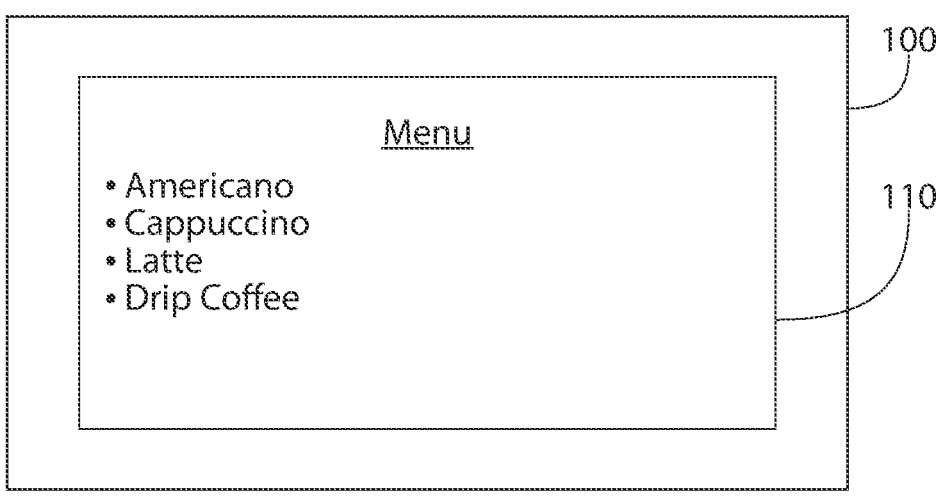

FIGS. 6A-6D show example user interfaces in which a pack is determined to be out of stock and the beverage dispensing apparatus 100 determines (e.g., subsequently determines) that the pack is in stock. As shown on FIG. 6A, beverage dispensing apparatus 100 shows (e.g., shows via display 110) packs that are in stock (House Blend, Morning Roast, Hazelnut, English Breakfast, Milk Froth) and packs that are out of stock (Chai Spice, Hot Chocolate, French Vanilla). In FIG. 6B, beverage dispensing apparatus 100 shows beverages that can be produced based on the in-stock packs. For example, Americano, Cappuccino, Latte, and Drip Coffee may be produced when House Blend, Morning Roast, Hazelnut, English Breakfast, Milk Froth packs are in stock. The beverage dispensing apparatus 100 may provide an indication of the beverage(s) to be produced based on the pack corresponding to the beverage being in stock.

Figure 6C:
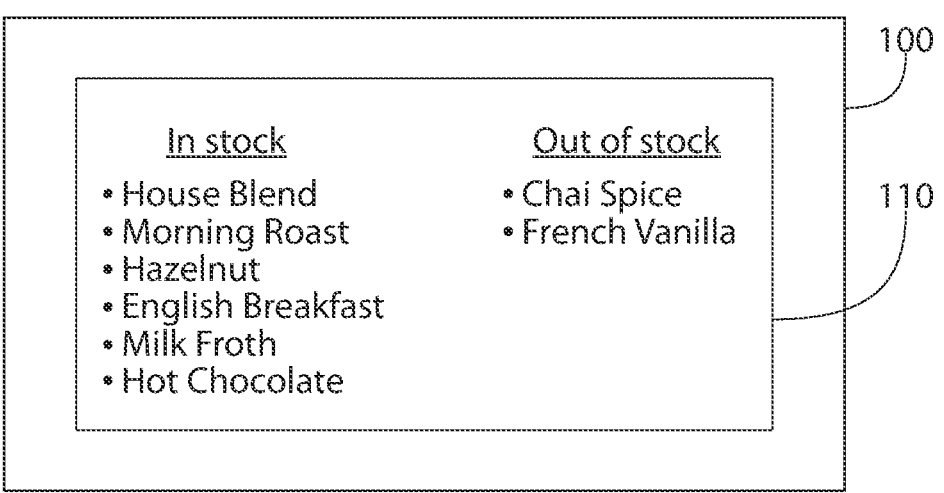
Figure 6D:
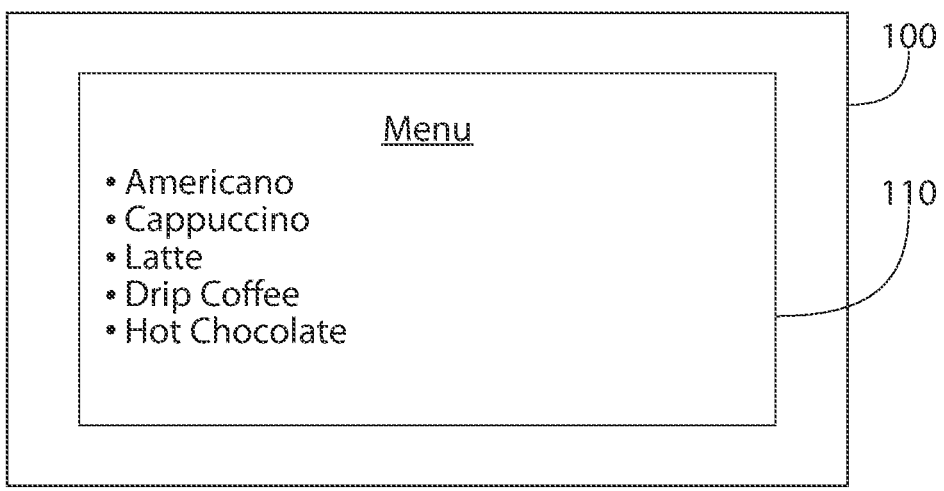

FIG. 6C shows beverage dispensing apparatus 100 being updated (e.g., display 110 being updated) when packs that were previously determined to be out of stock are determined to be in stock. For example, Hot Chocolate has moved from out of stock (in FIG. 6A) to in stock (in FIG. 6C). In FIG. 6D, beverage dispensing apparatus 100 is updated to show beverages that can be produced based on the in-stock packs. For example, FIG. 6D is updated to show that Hot Chocolate is on the menu as Hot Chocolate has been determined to be in stock. Having the beverage dispensing apparatus 100 continually monitoring for packs (e.g., packs that are indicated as in stock and/or out of stock) may reduce the need for the beverage dispensing apparatus 100 to be reconfigured, for example, when a site of the beverage dispensing apparatus 100 desires (e.g., at a later date and/or time) to order an extended range of packs.

As described herein, a beverage dispensing apparatus 100 may provide a menu (e.g., a beverage menu). The menu may be specific to the beverage dispensing apparatus 100, for example, the menu may include information that is specific to a beverage dispensing apparatus 100 located at a particular location (e.g., geographic location). The menu may include information related to a location, such as an identification of the location of the beverage dispensing apparatus 100, a location of one or more packs used by the beverage dispensing apparatus 100, a location of where additional packs may be found (e.g., in another room, building, or retailer), and the like.

The beverage dispensing apparatus 100 may display (e.g., on display 110) a menu. The menu may include one or more beverage options. The beverage options may be customized based on beverage preparation ingredient package types. For example, beverage options may be customized based on beverage preparation ingredient package types that are stocked at a geographic location (e.g., a geographic location associated with the beverage dispensing apparatus 100) and/or available to the beverage dispensing apparatus 100.

The beverage dispensing apparatus 100 may determine that a pack identified as out of stock may be in stock. For example, a pack identified as out of stock may be provided to (e.g., inserted into) the beverage dispensing apparatus 100. The beverage dispensing apparatus 100 may determine that the pack identified as out of stock is in stock, for example, based on the pack being provided to (e.g., physically provided to, such as inserted into) the beverage dispensing apparatus 100, the pack being detected by the beverage dispensing apparatus 100, etc. For example, the beverage dispensing apparatus 100 may determine that a pack is in stock via an electronic reading of the pack. The electronic reading may be via an RFID reading, an image recognition, or other electronic readings of labels, QR codes, etc. The beverage dispensing apparatus 100 may update (e.g., automatically update) a menu of beverage dispensing apparatus 100, based on the pack being in stock. The beverage dispensing apparatus 100 may update a menu to include beverage options (e.g., one or more additional beverage options) that may be produced by beverage dispensing apparatus 100 using the identified (e.g., previously identified) out of stock pack (e.g., beverage preparation ingredient package type).

As described herein, a beverage dispensing apparatus 100 may receive information relating to packs (e.g., beverage packs). The information relating to the packs may include an indication packs (e.g., beverage preparation ingredient package types) that are in stock packages and which of the plurality of beverage preparation ingredient package types are out of stock packages. The beverage dispensing apparatus 100 may provide an indication (e.g., by displaying text/images via display 110, audio, etc.) of the status (e.g., in stock status, out of stock status) of the packs. The beverage dispensing apparatus 100 may store the indication of the status of the packs, for example, for a determination of the beverages that may be produced.

A menu (e.g., a customized menu) may include beverage options based on the status of the packs. For example, a menu may include beverage options that may be based on the status of the packs, such as beverage options that may be available using the in-stock packages.

As described herein, one or more packs may be identified as being out of stock. The beverage dispensing apparatus 100 may receive (e.g., subsequently receive) packs that are identified as being out of stock. As described herein, the beverage dispensing apparatus 100 may determine that the pack identified as out of stock is inserted into the beverage dispensing apparatus 100. The beverage dispensing apparatus 100 may update the pack as being in stock (e.g., newly in stock). The beverage dispensing apparatus 100 may permanently update the pack as being in stock, or the beverage dispensing apparatus 100 may make a temporary (e.g., one time) modification of the status of the pack being in stock. The beverage dispensing apparatus 100 may update the customized menu to include one or more additional beverage options that can be made using the newly in stock package automatically using the processor of the beverage dispensing apparatus. In examples the beverage dispensing apparatus 100 may determine locations proximate to beverage dispensing apparatus 100 in which out of stock packages are available. The locations may be other beverage dispensing apparatuses, stores selling the packages, etc.

The beverage dispensing apparatus 100 may continually update (e.g., modify) the status (e.g., inventory status) of the packs. For example, the beverage dispensing apparatus 100 may modify the status of the packs from out of stock to in stock, as described herein. The beverage dispensing apparatus 100 may also, or alternatively, modify the status of the packs from in stock (e.g., recently updated to in stock) to out of stock. For example, if a pack is removed from the beverage dispensing apparatus 100 prior to a beverage being produced, if the pack is determined to be empty after the beverage is produced, if the pack is removed from the beverage dispensing apparatus 100 before a predetermined time (e.g., within 30 seconds), the beverage dispensing apparatus 100 may update the status of the pack (e.g., the pack recently updated to be in stock) as out of stock. In such example, the beverage dispensing apparatus 100 may update the beverage menu based on the pack being determined to be out of stock.

Custom drink combinations may be provided. Beverage dispensing apparatus 100 may produce a beverage based on one or more packs (e.g., beverage packs). For example, beverage dispensing apparatus 100 may produce a beverage based on a single pack. The beverage produced from a single pack may be known (e.g., previously known). For example, if beverage dispensing apparatus 100 produces a beverage with a single cappuccino pack, the user should expect that the beverage will have a taste corresponding to the single pack. In other examples, beverage dispensing apparatus 100 may produce a beverage based on more than one pack. If beverage dispensing apparatus 100 produces a beverage with more than one pack, the user may not know how combination of the packs will taste.

Figure 7:
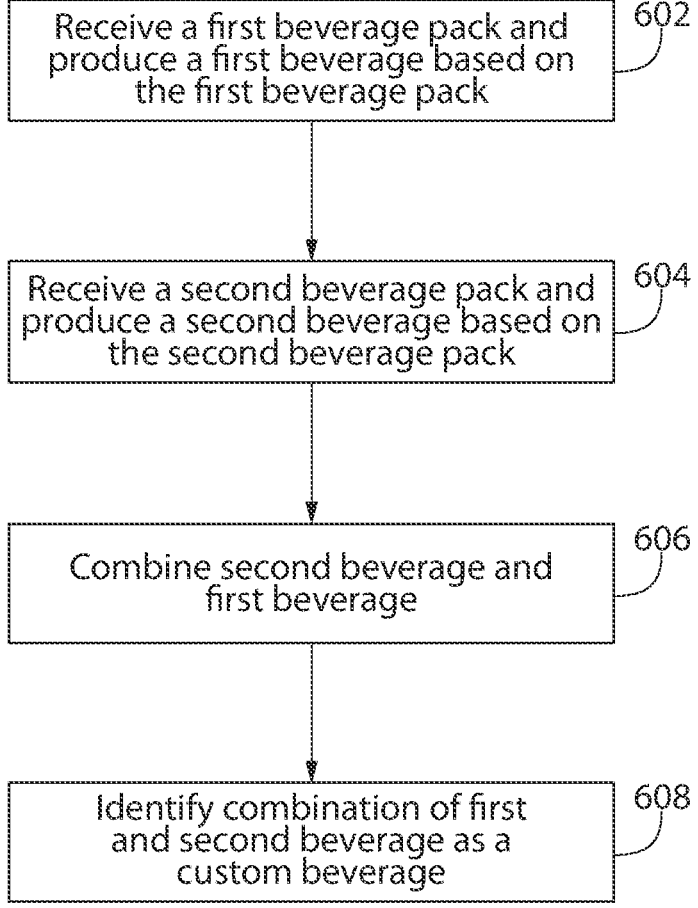
FIG. 7 is an example process in which a user may produce a beverage based on one or more packs.

FIG. 7 shows an example process in which a user may produce a beverage based on one or more packs. For example, the user may provide a single pack and the beverage dispensing apparatus 100 may produce a beverage based on the single pack, at 602. When the single pack is used to produce a beverage, the beverage dispensing apparatus 100 (e.g., display 110 of the beverage dispensing apparatus 100) may indicate to the user that the beverage (e.g., non-customized beverage) has been produced. As an example, a volume of liquid may be injected into the beverage preparation ingredient package to form a non-customized beverage. The beverage dispensing apparatus 100 may indicate that the beverage is produced, and provide a message for the user that the beverage may be removed from beverage dispensing apparatus 100.

At 604, the user may provide the other pack (e.g., a second, or subsequent, pack) and the beverage dispensing apparatus 100 may produce a beverage based on the other pack. For example, although beverage dispensing apparatus 100 may indicate that the beverage may be produced via a single beverage pack (e.g., single beverage preparation ingredient package), the beverage dispensing apparatus 100 may not require the beverage pack to be removed. For example, the beverage dispensing apparatus 100 may permit a container (e.g., a beverage preparation ingredient package, cup, etc.) to remain within the beverage dispensing apparatus 100 after the beverage is produced. The beverage dispensing apparatus 100 may allow another pack (e.g., a second, or subsequent, pack) to be used as the container (e.g., first beverage preparation ingredient package) remains within the beverage dispensing apparatus 100. The beverage dispensing apparatus may inject a second volume of liquid into the second beverage preparation ingredient package to form a second non-customized beverage. The first pack (e.g., beverage preparation ingredient package) and the second (e.g., subsequent) pack may form a beverage (e.g., customized beverage). The customized beverage formed by the first pack and the second pack may not be recognized by the beverage dispensing apparatus as a default beverage.

At 606, the beverage dispensing apparatus 100 may determine a beverage that may be produced using the first pack provided to the beverage dispensing apparatus 100 and the second pack provided to the beverage dispensing apparatus 100. The beverage producible by the first and second packs (e.g., combination of the first and second packs) may be added to a menu (e.g., added to the menu as a default beverage). The default beverage may be provided to the user of the beverage dispensing apparatus 100 via the menu. As an example, a pack A may produce a beverage and the beverage from pack A may be dispensed into a container. Thereafter a pack B may produce a beverage and the beverage from pack B may be dispensed into the container (e.g., the same container in which pack A was dispensed). Pack A and pack B may container similar ingredients, different ingredients, or a combination of similar and different ingredients. In another example, pack A and pack B may produce a beverage and the beverage from pack A and pack B may be dispensed (e.g., simultaneously dispensed) into a container.

If two or more packs are used to produce a beverage within the same container, the beverage dispensing apparatus 100 may identify the produced beverage as a custom beverage, at 608. The custom beverage may be identified based on the names of the two or more packs (e.g., custom beverage may be identified by the combination of packs A and B), based on the names of the ingredients of the two packs (e.g., custom beverage may be identified by the combination of ingredients of packs A and B), etc. Beverage dispensing apparatus 100 may store information relating to the custom beverage. For example, beverage dispensing apparatus 100 may store the identity of the custom beverage, the frequency in which the custom beverage is produced, the times/days/dates at which the custom beverage is produced, user ratings of the custom beverage, etc. For example, beverage dispensing apparatus 100 may request that the user provide an indication of satisfaction or dissatisfaction of the custom beverage.

The beverage dispensing apparatus 100 may include the custom drink as a default (e.g., standard) drink, for example, if the custom beverage becomes popular (e.g., if the frequency at which the customized beverage is being made with the beverage dispensing apparatus is above a predetermined value) and/or if the customer beverage receives favorable feedback from users of the beverage dispensing apparatus 100. The beverage dispensing apparatus 100 may transmit and/or store information relating to the custom drinks to the network (including a main server on the network). For example, the beverage dispensing apparatus 100 may transmit information to a main server so that the custom beverage may be added as a default/standard beverage to one or more beverage dispensing apparatuses 100 in different locations.

As described herein, beverage dispensing apparatus 100 may monitor and/or store beverages that are produced by the beverage dispensing apparatus 100. For example, a pack (e.g., a beverage preparation ingredient package) may be provided to (e.g., inserted into) beverage dispensing apparatus 100. The beverage dispensing apparatus 100 may be in communication with a server, such as server 260 (e.g., a cloud server), via network 220. The beverage dispensing apparatus 100 may provide usage information to the server 260, beverage consumption information to the server 260, custom beverages (e.g., identities, popularities, rating of custom beverages) to the server, etc.

A user may activate the beverage dispensing apparatus 100 to produce a beverage, for example, by injecting a volume of liquid into a pack (e.g., a single beverage preparation ingredient package). Injecting the liquid into the pack may form a non-customized beverage. The non-customized beverage may be dispensed into a container, such as a drinking vessel/cup. Another pack (e.g., beverage preparation ingredient package) may be inserted into the beverage dispensing apparatus 100. The beverage dispensing apparatus 100 may inject another volume of liquid into the other beverage preparation ingredient package. The beverage dispensing apparatus 100 may dispense a beverage containing the two packs. Dispensing the two packs into the drinking vessel may result in the production (e.g., formation) of a customized beverage. The customized beverage may include a recipe (e.g., a recipe of beverage ingredients) for making the customized beverage.

Information relating to the customized beverage (such as the recipe of customized beverage, identity of customized beverage, etc.) may be stored at the beverage dispensing apparatus 100 and/or transmitted to one or more external devices. For example, information relating to the customized beverage may be transmitted to a user device, a server, another beverage dispensing apparatus 100, etc. The information relating to the customized beverage may be transmitted to a user device, a server, another beverage dispensing apparatus 100 based on a frequency at which the customized beverage is being made and/or requested. For example, upon the frequency at which the customized beverage is being made and/or requested exceeding a pre-determined frequency, the menu of the beverage dispensing apparatus may be updated to display the customized beverages exceeding the pre-determined frequency.

Beverage dispensing apparatus 100 may identify packs that are available (e.g., in stock) for use. Beverage dispensing apparatus 100 may identify beverages (e.g., customized beverages) that may be produced based on one or more (e.g., two) of the available packs. The beverage dispensing apparatus 100 may display (e.g., automatically display, such as on display 110) a menu, for example, based on the packs available. The menu may include one or more beverage options that may be made using packs (e.g., available beverage preparation ingredient packages).

Beverage dispensing apparatus 100 and/or an external device (e.g., a server, user device, etc.) may monitor a frequency at which the customized beverage is being requested and/or produced. For example, beverage dispensing apparatus 100 and/or an external device may identify when a request of a custom beverage reaches, exceeds, and/or falls below a pre-determined value (e.g., frequency value). Beverage dispensing apparatus 100 and/or an external device may identify when feedback of a custom beverage reaches, exceeds, and/or falls below a pre-determined value (e.g., user satisfaction value). The beverage dispensing apparatus 100 and/or an external device may categorize the custom beverage based on the frequency and/or user satisfaction of the request. For example, a request for a custom beverage exceeding a predetermined value (e.g., frequency value, user satisfaction value) may indicate that the custom beverage is a popular beverage that may be put into general circulation. A request for a custom beverage falling below a value may indicate that the custom beverage is not a popular beverage and should not be put in (or should be taken out of) general circulation. Beverage dispensing apparatus 100 may provide an updated indication (e.g., via a menu), based on the request and/or production of the custom beverage. Beverage dispensing apparatus 100 may update the indication automatically, or beverage dispensing apparatus 100 may update the indication based on an event, at time, a duration, etc.

Beverage customization may be provided. For example, beverage dispensing apparatus 100 may provide one or more beverages and/or beverage types. Each beverage type may be associated with a brew cycle (e.g., a predetermined/default brew cycle). The brew cycle may deliver a volume (e.g., volume of the beverage) and/or strength (e.g., strength of the beverage). In examples the volume and/or strength of the brew cycle may be predetermined (e.g., predetermined based on the brew cycle and/or based on a pack provided to the beverage dispensing apparatus 100). The beverage dispensing apparatus 100 may be adjustable so that the volume and/or strength of the beverage to be produced may be modified. For example, a user may select a beverage and/or beverage type and provide (e.g., insert) a pack for the selected beverage and/or beverage type. The beverage dispensing apparatus 100 may be customized to produce one or more types of beverages (e.g., beverage types) based on the selected beverage, selected beverage type, and/or pack provided by the user.

Customization of a beverage may include beverage volume adjustment and/or beverage strength adjustment. The beverage dispensing apparatus 100 may store predetermined values relating to minimum and/or maximum volumes and/or strengths, although in examples beverage dispensing apparatus 100 may receive predetermined values relating to minimum and/or maximum volumes and/or strengths via one or more external devices (e.g., user devices, servers, etc.). The beverage dispensing apparatus 100 may provide a beverage (e.g., a predetermined beverage) based on the predetermined values and/or the beverage dispensing apparatus 100 may provide a beverage with adjusted values for the volume, strength, etc. of the produced beverage. The adjusted values may produce a beverage that has a higher volume and/or higher strength than the predetermined beverage, a beverage that has a lower volume and/or lower strength than the predetermined beverage, or any combination thereto.

Beverages having a higher volume and/or higher strength than the predetermined beverage, a lower volume and/or lower strength than the predetermined beverage, or any combination thereto may be stored for later uses. For example, beverage dispensing apparatus 100 may produce a custom beverage that may have a higher lower volume and/or a higher strength than a predetermined (e.g., default) beverage. The custom beverage may be produced on more than one occasion for one or more users of the beverage dispensing apparatus 100. The requests for the custom beverage may indicate that the custom beverage is (or may become) a popular beverage. The beverage dispensing apparatus 100 and/or an external device (e.g., a server, a user device, etc.) may determine that the custom beverage is (or may become) a popular beverage.

In examples the beverage dispensing apparatus 100 and/or the external device may indicate that the custom beverage should be a default beverage. The custom beverage may become a default beverage based on a location (e.g., only beverage dispensing apparatuses 100 in a location similar to the location in which the custom beverage was initially requested and/or mostly requested may become a default beverage) and/or based on a frequency (e.g., high frequency) in which the custom beverage is requested. In other examples, a custom beverage may become a default beverage for one or more other locations, such as for all beverage dispensing apparatuses 100 located within a region or for all beverage dispensing apparatuses 100. Beverage dispensing apparatus 100 may indicate that a beverage previously known as a custom beverage having volume and/or strength different than a default volume and/or strength may be known as a default beverage. Such indication may result in the filling (e.g., consistent filling) of a container without a user needing to customize a beverage's volume and/or strength.

In examples, beverage dispensing apparatus 100 may create (e.g., dynamically create) a brew cycle. The brew cycle may be based on a template and/or may be adjusted for a selected volume and/or strength. A volume of the beverage may be adjusted, for example, by adjusting (e.g., lengthening, shortening) a dwell time. The adjusted dwell time may adjust a pressure of the liquid presented by the beverage dispensing apparatus 100. For example, the adjusted dwell time may reduce a pressure presented by the beverage dispensing apparatus 100. A strength of the beverage may be adjusted. For example, beverage dispensing apparatus 100 may create (e.g., automatically create) strong brew cycles. Beverage dispensing apparatus 100 may create (e.g., automatically create) strong brew cycles based on a template brew cycle, for example, that may be associated with the pack being brewed. The brew cycle may reduce and/or increase flow rates of the liquid dispensed by the beverage dispensing apparatus 100 to increase/decrease the volume and/or strength of a beverage. The brew cycle may reduce and/or increase dwell times of the liquid dispensed by the beverage dispensing apparatus 100 to increase/decrease the volume and/or strength of a beverage.

As described herein, a customized beverage may be dispensed from a beverage dispensing apparatus 100. For example, a user may select a beverage (e.g., beverage type). The user may select the beverage type from one or more beverage types. The user may desire that the beverage type be produced by and/or dispensed from the beverage dispensing apparatus 100. The beverage dispensing apparatus 100 may store instructions (e.g., default instructions) for making a beverage of a beverage type, although in examples the beverage dispensing apparatus 100 may receive instructions (e.g., default instructions) for making a beverage of a beverage type from one or more external devices, such as a user device or a server. The instructions (e.g., default instructions) may include a preset (e.g., predetermined) volume and/or a preset (e.g., predetermined) strength.

FIG. 8 shows an example process for customizing a strength and/or volume of the beverage. For example, at 702 the beverage dispensing apparatus 100 may receive an indication for the production of a beverage via a user selection and/or via receiving a pack for producing a beverage. The beverage dispensing apparatus 100 may determine the strength and/or volume (e.g., preset strength and/or volume) of the beverage, at 704. The beverage dispensing apparatus 100 (e.g., display 110) may present the strength and/or volume of the beverage to be produced.

At 706, the beverage dispensing apparatus 100 (via buttons 112) may receive instructions to modify and/or adjust the strength and/or volume of a beverage. The beverage dispensing apparatus 100 may determine whether the adjusted strength and/or volume is a safe strength and/or volume. The strength of the beverage may be modified to be lower or higher than the preset (e.g., predetermined) strength of the beverage. The volume of the beverage may be modified to be higher or lower than the preset (e.g., predetermined) volume. The beverage dispensing apparatus 100 may be configured to produce and/or dispense the beverage having a strength and/or volume (e.g., modified strength and/or modified volume), at 708. For example, the beverage dispensing apparatus 100 may be configured to produce and/or dispense the beverage having a strength and/or volume that is different than the preset (e.g., predetermined) strength and/or volume. The beverage having a strength and/or volume that is different than the preset strength and/or volume may be determined to be a beverage that is a customized beverage. The beverage dispensing apparatus may associate the beverage having a modified strength and/or modified volume with a user of the beverage dispensing apparatus. Information relating to the beverage having a strength and/or volume that is different than the preset strength and/or volume (e.g., association information of the user and the beverage having the modified strength or modified volume) may be saved, for example, in database 160. In examples information relating to the beverage having a strength and/or volume that is different than the preset strength and/or volume may be received, for example, via an external device. The saved and/or received information may be used to produce a beverage (e.g., customized beverage) having a strength and/or volume that is different than the preset strength and/or volume.

A user survey may be provided. A user may desire that the beverage dispensing apparatus 100 produce a beverage, as described herein. It may take some time from the selection of the beverage to the production of the beverage for the beverage dispensing apparatus 100 to produce the beverage. The beverage dispensing apparatus 100 may provide information and/or receive information from the user of the beverage dispensing apparatus 100. The beverage dispensing apparatus 100 may provide information and/or receive information from the user of the beverage dispensing apparatus 100 during the time that it takes to produce the beverage, prior to the beverage dispensing apparatus 100 producing the beverage, and/or after the beverage dispensing apparatus 100 produces the beverage. For example, the beverage dispensing apparatus 100 (e.g., display 110) may provide information to a user of the beverage dispensing apparatus 100 while the beverage is being produced.

Information provided to the user of beverage dispensing apparatus 100 and/or received from the user of beverage dispensing apparatus 100 may include survey information, beverage recommendation information, pack inventory information, time information, date information, weather information, sports information, stock information, etc. The information to be provided by the beverage dispensing apparatus 100 and/or received by beverage dispensing apparatus 100 may be configurable. For example, the beverage dispensing apparatus 100 may provide information based on the user of the beverage dispensing apparatus 100. The beverage dispensing apparatus 100 may determine which user is using the beverage dispensing apparatus 100 via a manual input from the user. In other examples, the beverage dispensing apparatus 100 may determine the user based on a user device (e.g., smartphone) of the user.

The beverage dispensing apparatus 100 may also, or alternatively, receive input from a user. The beverage dispensing apparatus 100 may receive input from the user via a manual input (e.g., via buttons 112) and/or via a user device of the user. For example, a user device of a user may communicate (e.g., communicate wirelessly) with the beverage dispensing apparatus 100. In such an example, the user may input information into the user device and the user device may transmit (e.g., wirelessly transmit, via Bluetooth, the Internet, etc.) the information to the beverage dispensing apparatus 100.

The beverage dispensing apparatus 100 may store the information received from the user and/or may transmit the information to an external device. The external device may be server 160 (e.g., a cloud server), another beverage dispensing apparatus 100, an inventory management device, an online store, etc. Based on the input provided by the user, the beverage dispensing apparatus 100 may order additional (or less) packs. For example, if the user(s) input that a particular beverage is desired, the beverage dispensing apparatus 100 may order (e.g., automatically order) packs that may be used to produce the desired beverage. In contrast, if the user provides that a particular beverage is undesired, the beverage dispensing apparatus 100 may order (e.g., automatically order) less packs that are used to produce the undesired beverage or cause the packs producing the undesired beverage to be removed from inventory.

The beverage dispensing apparatus 100 may provide a survey (e.g., standard survey) to the user, for example, via display 110 or via an application on the user device of a user. The user survey may relate to operation of the beverage dispensing apparatus 100 (e.g., how easy or hard it is to operate the beverage dispensing apparatus 100), may relate to beverages produced by the beverage dispensing apparatus 100 (e.g., which beverages are preferred and/or not preferred by the user), etc. The beverage dispensing apparatus 100 may provide follow up questions based on the responses provided by the users. For example, if a user provides that the beverage dispensing apparatus 100 is difficult to operate, the beverage dispensing apparatus 100 may request that the user provide suggestions for making the beverage dispensing apparatus 100 easier to operate and/or the beverage dispensing apparatus 100 may ask how the beverage dispensing apparatus 100 is difficult to operate.

Figure 9:
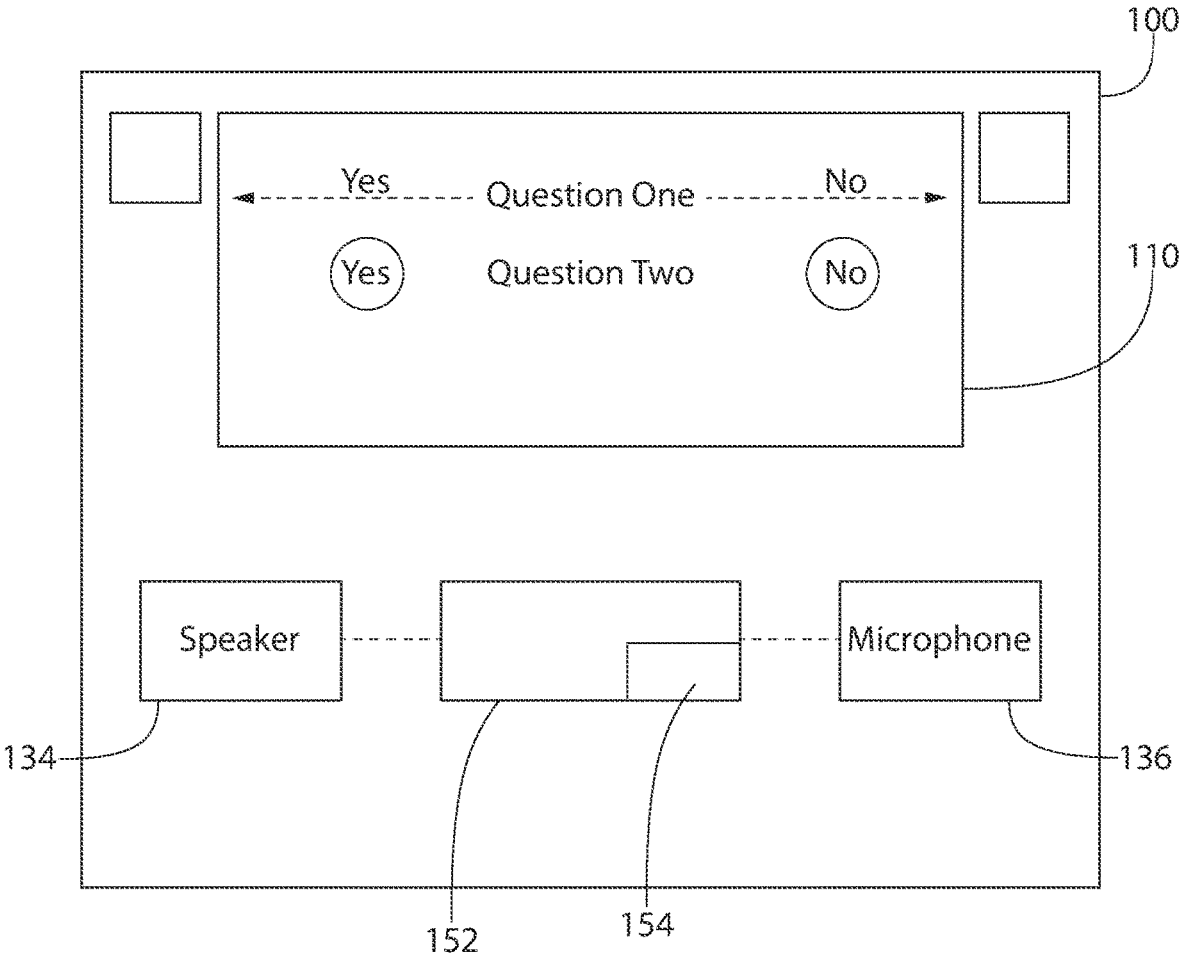
FIG. 9 is an example user interface of a beverage dispensing apparatus including user responses.

The beverage dispensing apparatus 100 may request open-ended responses. For example, the beverage dispensing apparatus 100 may ask a question and provide a text box that allows the user to provide an answer free form. The beverage dispensing apparatus 100 may ask true-false questions, may ask the user to provide a rank (e.g., a rank of one or more features of the beverage dispensing apparatus 100, one or more beverages produced by the beverage dispensing apparatus 100, etc.) according to a scale (e.g., scale from 1-10). As shown on FIG. 9, an example user interface (e.g., display 110) may include user responses to yes/no questions, etc.

As described herein, the user may receive the survey via beverage dispensing apparatus 100 (e.g., display 110 of beverage dispensing apparatus 100), via an application on user's user device, via an SMS message, an email message, etc. The user may provide answers to the survey via beverage dispensing apparatus 100 (e.g., buttons 112 of beverage dispensing apparatus 100), via an application on user's user device, via an SMS message, an email message, etc. The survey may be provided via video and/or audio. For example, beverage dispensing apparatus 100 may provide the survey via text and may receive the user's response(s) via audio (e.g., via the voice of the user).

As described herein, a beverage dispensing apparatus 100 may solicit feedback from a user of the beverage dispensing apparatus 100. For example, beverage dispensing apparatus 100 may solicit feedback while making and/or dispensing a beverage. The beverage dispensing apparatus 100 may be actuated (e.g., activated) to produce and/or dispense a beverage. For example, the user may actuate the beverage dispensing apparatus 100 to produce a beverage via a button action of the beverage dispensing apparatus 100 and/or via an application on the user's user device (e.g., smart phone).

The beverage dispensing apparatus 100 may include peripheral devices, such as display 110, a microphone 136, a speaker 134, etc. The beverage dispensing apparatus 100 may display one or more questions on the display 110, for example, while the beverage dispensing apparatus 100 is making and/or dispensing a beverage and/or before/after the beverage dispensing apparatus 100 makes and/or dispenses a beverage. The beverage dispensing apparatus 100 may receive responses to the one or more questions from a user of the beverage dispensing apparatus 100. For example, the beverage dispensing apparatus 100 may receive responses via a microphone 136 of the beverage dispensing apparatus 100, via buttons 112, via softkeys (e.g., via keys displayed on display 110, etc.). The responses may be stored on the beverage dispensing apparatus 100 and/or transmitted to one or more external devices.

Service response tracking may be provided. Beverage dispensing apparatus 100 may incur a fault (e.g., error). The fault may be due to the beverage dispensing apparatus 100 not being able to perform an action. The fault may be determined to be a hard fault or a soft fault (e.g., a fault other than a hard fault). A hard fault may require correction via a technician, and a soft part may be corrected by beverage dispensing apparatus 100 or a user of beverage dispensing apparatus 100. Beverage dispensing apparatus 100 may continue to operate (e.g., operate with limited functionality) during a soft fault. A fault (e.g., hard fault, soft fault) may occur upon the beverage dispensing apparatus 100 receiving an input (e.g., an input to dispense a beverage) from a user and the beverage dispensing apparatus 100 may not be capable of handling the input.

When the beverage dispensing apparatus 100 incurs a fault, the beverage dispensing apparatus 100 may provide an indication of the fault. The indication of the fault may be provided by the beverage dispensing apparatus 100 (e.g., provided by display 110 of beverage dispensing apparatus 100, via an audio tone of speakers 134, etc.) and/or the indication of the fault may be provided via an external device, such as via a user device of a user of the beverage dispensing apparatus 100. The indication may include an identification of the fault, a seriousness of the fault, a type of the fault, a cause of the fault, possible corrections to the fault, etc. The indication may include contact information of a person that may correct the fault, although in examples the beverage dispensing apparatus 100 may contact (e.g., automatically contact) and/or schedule a person to correct the fault. The contact information may relate to a user, technician (e.g., repair person), manufacturer, etc., of the beverage dispensing apparatus 100. The beverage dispensing apparatus 100 may receive and/or provide updates of the fault (e.g., statuses of the fault). The updates may be used to correct a fault (e.g., a fault that is occurring) and/or the updates may be used to prevent one or more faults.

Upon encountering a fault, an indication of the fault may be transmitted from the beverage dispensing apparatus 100 to a device (e.g., user device, server, etc.) external to the beverage dispensing apparatus 100. The indication may be transmitted automatically. For example, the beverage dispensing apparatus 100 may transmit (e.g., automatically transmit) the indication. The indication of the fault may be associated with information, such as enhanced information. The information may be transmitted to a server (e.g., external server, such as server 260), to a user device, to an internet of things (IoT) device, to a user (e.g., a consumer of the beverage provided by the beverage dispensing apparatus 100, a technician), etc. The beverage dispensing apparatus 100 may provide time and/or date information related to the fault, such as when the fault occurred, confirmation of when the fault was reported, an estimated time to fix the fault, a status of the fault, the fault type, a message (e.g., a custom message) from/to a user of the beverage dispensing apparatus 100, etc.

The beverage dispensing apparatus 100 may display and/or provide (e.g., transmit) the fault in one or more types of ways. For example, the beverage dispensing apparatus 100 may display (e.g., initially display) and/or transmit a code of the fault. The code may be associated with the fault. A secondary source, such as a reference source, may be used (e.g., needed) to interpret the code to determine the fault and/or address the fault. In examples the beverage dispensing apparatus 100 may display information (e.g., all information) required to determine the actual fault and/or address the fault.

The beverage dispensing apparatus 100 may allow a user and/or maintainer of the beverage dispensing apparatus 100 to determine information (e.g., additional information) of the fault, for example, via additional actions. As an example, a user and/or maintainer of beverage dispensing apparatus 100 (e.g., technician) may press an indicator on the beverage dispensing apparatus 100 so that the initial fault and/or report is provided or that additional information related to the fault and/or report is provided. The beverage dispensing apparatus 100 may display (e.g., display on a touch screen) buttons, such as cancel/done/clear buttons, so that action may be performed on the beverage dispensing apparatus 100. A button (e.g., a clear button) may be provided so that a fault may be cleared, evaluated, transmitted, etc.

As described herein, the fault may be provided to a user/technician local to the beverage dispensing apparatus 100. The fault may be provided to a user/technician that is remote to the beverage dispensing apparatus 100. A user/technician may address the fault locally and/or remotely. For example, a user may locally see that the beverage dispensing apparatus 100 is incurring a fault. The user may interact with the beverage dispensing apparatus 100 to determine the cause of the fault and/or the user may use an external device (e.g., a server or user device, including an application of the user device) to determine the cause of the fault. The user may use a user device (e.g., an application of the user device) to correct the fault. A user and/or technician may remotely interact with the beverage dispensing apparatus 100 to address a fault. For example, a user and/or technician may turn off and/or turn on the beverage dispensing apparatus 100 to clear a fault with the beverage dispensing apparatus 100. The beverage dispensing apparatus 100 may provide a report (e.g., updated report) of faults based on the action taken by the user/maintainer.

The beverage dispensing apparatus 100 may record and/or provide (e.g., transmit) information relating to a fault. For example, the beverage dispensing apparatus 100 may record and/or transmit the identity (e.g., name, type, etc.) of the fault, cause of the fault, remedy of the fault, user of the beverage dispensing apparatus 100 during the fault, person who corrected the fault, time/date of the fault, duration (if any) that the beverage dispensing apparatus 100 was inoperable during the fault, time/date in which the fault was repaired, etc. The beverage dispensing apparatus 100 may determine and/or store the efficiency of the repair of the fault based on the fault information. For example, the beverage dispensing apparatus 100 may determine the efficiency of the repair of the fault by determining the identity of the fault and the time that it took to repair the fault. The beverage dispensing apparatus 100 may receive feedback information relating to the fault from a user of the beverage dispensing apparatus, for example, via a user interface of the beverage dispensing apparatus.

The information relating to the fault may be transmitted to one or more external devices, such as a server, database, user device, another beverage dispensing apparatus 100, IoT device, etc. The fault information may be gathered and/or used (e.g., gathered and/or used by one or more other beverage dispensing apparatuses, technicians, manufacturers, etc.) to establish response times, fault frequency, corrective actions, etc. For example, a beverage dispensing apparatus 100 incurring more faults than other beverage dispensing apparatuses may indicate a more serious issue with the beverage dispensing apparatus 100 (e.g., type of beverage dispensing apparatus 100). The beverage dispensing apparatus 100 (e.g., type of beverage dispensing apparatus 100) may be removed from circulation for user convenience and/or to determine the cause of the faults. In other examples, the correction action used to address a fault may be shared with one or more other beverage dispensing apparatuses, technicians, and/or manufacturers, which may reduce repair times in other beverage dispensing apparatuses.

In an example, the beverage dispensing apparatus 100 may be non-operational, for example, due to an occurrence of a fault. The beverage dispensing apparatus 100 may transmit (e.g., automatically transmit) a fault signal indicative of the occurrence of the fault. For example, the beverage dispensing apparatus 100 may transmit a fault signal indicative of the occurrence of the fault to an operator of the beverage dispensing apparatus 100, a maintainer of the beverage dispensing apparatus 100, a repository, etc. The fault signal may include one or more pieces of information, such as the fault type, the date at which the fault occurred, the time at which the fault occurred, the date at which the fault is expected to be corrected, the time at which the fault is expected to be corrected, a location of the beverage dispensing apparatus 100 experiencing the fault, etc. Information relating to operational beverage dispensing apparatuses may be provided via the beverage dispensing apparatus 100 so that users can continue to receive beverages while the beverage dispensing apparatus 100 is experiencing a fault.

A user and/or maintainer of the beverage dispensing apparatus 100 may receive information from, or send information to, the beverage dispensing apparatus 100. For example, a user and/or maintainer of the beverage dispensing apparatus 100 may receive information from, or send information to, a user interface (e.g., display 110) of the beverage dispensing apparatus 100. As an example, a maintainer of the beverage dispensing apparatus 100 may transmit information to the beverage dispensing apparatus 100. The information may be provided to the users of beverage dispensing apparatus 100 in one or more ways, such as displaying the information on display 110 of the beverage dispensing apparatus 100. For example, a maintainer may transmit a message to the beverage dispensing apparatus 100 that the maintainer is aware of the fault and an estimated time at which the beverage dispensing apparatus 100 will be fixed (such as the fault experienced by the beverage dispensing apparatus 100 is expected to be fixed shortly).

The beverage dispensing apparatus 100 may transmit information relating to the fault and/or receive information relating to the fault to another beverage dispensing apparatus 100, to a user device (e.g., an application on a user device) to an IoT device, to a server, etc. The beverage dispensing apparatus 100 may transmit information relating to the fault and/or receive information relating to the fault electronically. For example, beverage dispensing apparatus 100 may transmit information relating to the fault and/or receive information relating to the fault via an SMS message, an email message, etc.

A response to a fault of a beverage dispensing apparatus 100 may be tracked. For example, the beverage dispensing apparatus 100 may track the amount of times the beverage dispensing apparatus 100 has experienced one more faults (including the identifies of the faults experienced), the amount of time before the fault is acknowledged (e.g., acknowledged by a maintainer of the beverage dispensing apparatus 100), the amount of time before the fault is corrected, information provided to and/or from the maintainer of the beverage dispensing apparatus 100, user satisfaction of how the fault was addressed by the maintainer, etc. For example, upon the correction of the fault the beverage dispensing apparatus 100 may request from the user how satisfied the user was with the maintainer. The beverage dispensing apparatus 100 may provide an open-ended request for the user satisfaction (e.g., via a text box), may provide a true/false request, may provide a yes/no request, etc. The request for the user satisfaction may be provided via the beverage dispensing apparatus 100, via a user device (e.g., an application on the user device), etc.

As described herein, the fault may be cleared. For example, the user and/or maintainer may clear the fault by actuating a button on the display screen to clear the indicator from the display screen, the user and/or maintainer may clear the fault via a user device, etc. The fault information, including type of fault, time/date of fault, and/or time/date of correction of the fault may be saved and/or provided to one or more external devices, such as a user device or a server. The fault information may be saved locally by the beverage dispensing apparatus 100 and/or the fault information may be saved remotely (e.g., on a remote server, user device, etc.).

Configurable demonstration mode may be provided. A beverage dispensing apparatus 100 may be configurable. For example, the beverage dispensing apparatus 100 may be configured during setup (e.g., initial setup). The setup of the beverage dispensing apparatus 100 may be performed via a user interface, such as a graphical user interface (GUI). The GUI may be provided via the beverage dispensing apparatus 100 (via display 110 of the beverage dispensing apparatus 100) and/or the GUI may be provided via a device that is external to the beverage dispensing apparatus 100. For example, the GUI may be provided via an application provided on a user device (e.g., a smartphone).

The GUI may provide step by step instructions for a user to setup the beverage dispensing apparatus 100. The beverage dispensing apparatus 100 and/or an external device (e.g., user device) may provide a demonstration (e.g., a demo) for setup of the beverage dispensing apparatus 100. The GUI may provide instructions (e.g., or step-by-step instructions), hints (e.g., pop-up instructions, hints), guides, etc. The GUI may explain how the beverage dispensing apparatus 100 and/or pack may be setup, how the beverage dispensing apparatus 100 and/or work (e.g., work together), etc. The GUI may provide information prior at initial setup, prior to producing a beverage, and/or during production of a beverage. The GUI may provide other information, such as Help information. For example, the beverage dispensing apparatus 100 may provide a video of how the beverage dispensing apparatus 100 is to be used, for example, with one or more (e.g., one or more different) packs. As an example, the GUI may provide a video of how two-pack drinks may be made with the beverage dispensing apparatus 100.

The use of the GUI may be configurable. For example, the demonstration mode may be configurable so that the configuration mode is always on, always off, on for a predefined duration (e.g., for a predefined number of days, weeks, hours, vends, etc.). Configuration of the GUI may be beneficial, as the beverage dispensing apparatus 100 may be used in different settings. For example, users of the beverage dispensing apparatus 100 in a closed site (e.g., an office) may require the demonstrations to be used for a short time as the users (e.g., the same users) get acclimated to the new machine. In contrast, users of the beverage dispensing apparatus 100 in semi-public sites (e.g., airport lounges, hotels, etc.) may require the demonstrations to be used permanently as the users (e.g., different users) change and therefore permanently require an introduction to the setup and/or use of the beverage dispensing apparatus 100.

Location Configuration of beverage dispensing apparatus 100 (e.g., based on the location of beverage dispensing apparatus 100) may be provided. Beverage dispensing apparatus 100 may be configured for a particular user, for a particular location, for a particular duration, etc. As an example, beverage dispensing apparatus 100 may be configured to recommend one or more types of beverages during the summer, to recommend one or more type of beverages (e.g., different beverages) during the winter, etc.

Configuration of beverage dispensing apparatus 100 may be based on a single beverage dispensing apparatus 100 (e.g., a single beverage dispensing apparatus other than beverage dispensing apparatus 100), based on a cluster of beverage dispensing apparatuses, based on a location in which one or more beverage dispensing apparatuses are located, etc. For example, beverage dispensing apparatuses may be configured similarly (e.g., similarly to another beverage dispensing apparatus 100) when housed within a certain location (e.g., within an office at which another beverage dispensing apparatus 100 is located), as users within a certain location may have similar preferences and/or tastes.

The beverage dispensing apparatus 100 may be configured according to the type of services provided at a location, such as beverage dispensing services provided at an office and/or beverages typically provided at a geographic location within a particular season. For example, employees within an office setting may have similar tastes in beverages, employees within the financial industry may have similar tastes in beverages, and employees in an engineering office may have similar tastes in beverages. The beverage dispensing apparatus 100 may be configured using one or more pieces of information provided in a configuration file. Example information provided in a configuration file may include passwords of users of beverage dispensing apparatus 100, drink identities to be provided by beverage dispensing apparatus 100, payment settings, error and/or activity logs related to beverage dispensing apparatus 100, timed events (e.g., when one or more filters of beverage dispensing apparatus 100 have been changed), etc.

The configuration of the beverage dispensing apparatus 100 may be based on one or more of the categories provided herein. For example, when setting up the beverage dispensing apparatus 100, the beverage dispensing apparatus 100 may request the type of building that the beverage dispensing apparatus 100 will be set up in, the type of work performed by the users of the beverage dispensing apparatus 100, the ages of the users of the beverage dispensing apparatus 100, the climate of the area in which the beverage dispensing apparatus 100 is to be housed, etc. The beverage dispensing apparatus 100 may be configured based on information provided to the beverage dispensing apparatus 100. The beverage dispensing apparatus 100 may receive configuration information from an external device, such as an external server. The configuration information may receive the configuration information and/or download the configuration information. The beverage dispensing apparatus 100 may download (e.g., automatically download) the configuration information. The beverage dispensing apparatus 100 may download the configuration information based on an event (e.g., a download event of the user), a duration (e.g., weekly), a trend (e.g., users are using the beverage dispensing apparatus 100 less), etc.

A beverage dispensing apparatus 100 may replace another beverage dispensing apparatus 100. When replacing a beverage dispensing apparatus 100, it may be desirable for the replacing beverage dispensing apparatus 100 to be configurated in the same manner (e.g., with the same information) as the replaced beverage dispensing apparatus 100. For example, it may be desirable for the replacing beverage dispensing apparatus 100 to have the same settings (e.g., be configured similarly) as the replaced beverage dispensing apparatus 100. This may be desirable so that users of the replacing beverage dispensing apparatus 100 are not inconvenienced by the replacement of the beverage dispensing apparatus 100.

Configuration information may be provided to a replacing beverage dispensing apparatus 100. For example, configuration information may be copied from a replaced beverage dispensing apparatus 100 to a replacing beverage dispensing apparatus 100 via a wireless network, a wired network, an intermediary device, etc. The configuration information may be directed copied to the replacing beverage dispensing apparatus 100 and/or the configuration may be indirectly copied to the replacing beverage dispensing apparatus 100. For example, configuration information may be copied to a memory stick and/or a personal digital assistant (PDA) and then provided to (e.g., downloaded to) the replacing beverage dispensing apparatus 100. Also, or alternatively, configuration information may be stored on a server (e.g., a cloud server). The beverage dispensing apparatus 100 may receive the configuration information, for example, by downloading the configuration information from the server, from the replaced beverage dispensing apparatus 100, from a user device, etc.

Information relating to the beverage dispensing apparatus 100 may be used to assist in the receiving of the configuration information. For example, name information of the beverage dispensing apparatus 100, location information of the beverage dispensing apparatus 100, etc., may be used to assist in the receiving of the configuration information.

The beverage dispensing apparatus 100 may include a location device, such as global positioning system (GPS) device 138. The GPS device 138 may be used to determine the location of the beverage dispensing apparatus 100. The beverage dispensing apparatus 100 may determine whether the beverage dispensing apparatus 100 has moved, for example, by comparing the present location of the beverage dispensing apparatus 100 and prior locations of the beverage dispensing apparatus 100. The beverage dispensing apparatus 100 may determine locations of one or more other beverage dispensing apparatuses. Based on the location of the beverage dispensing apparatus 100 and one or more other beverage dispensing apparatuses, beverage dispensing apparatus 100 may determine a proximity of beverage dispensing apparatus 100 with one or more other beverage dispensing apparatuses (such as one or more beverage dispensing apparatuses replacing beverage dispensing apparatus 100).

The replaced beverage dispensing apparatus may have an identification device (e.g., an electronic identification device, such as an RFID device) that the replacing beverage dispensing apparatus can use to associate with the replaced dispensing apparatus. For example, the replacing beverage dispensing apparatus can scan an electronic identification device on the replaced beverage dispensing apparatus and receive (e.g., automatically receive) configuration information. The replacing beverage dispensing apparatus can download the configuration information received from the replaced beverage dispensing apparatus.

FIG. 10 shows an example process for configuring a beverage dispensing apparatus 100. At 902, a user may configure a beverage dispensing apparatus 100. A device (e.g., beverage dispensing apparatus 100, a server, etc.) may determine the locations of one or more beverage dispensing apparatuses (e.g., beverage dispensing apparatuses from which the beverage dispensing apparatus 100 will receive configuration information). For example, a replacement beverage dispensing apparatus may determine the location and/or configuration information of a beverage dispensing apparatus that is being replaced and/or the location of the replacement beverage dispensing apparatus.

During configuration (e.g., initial configuration) of the beverage dispensing apparatus 100 (e.g., the replacement beverage dispensing apparatus), the location of the beverage dispensing apparatus 100 may be determined, at 904. At 906, a device (e.g., a beverage dispensing apparatus, a user device, a server, etc.) may determine if one or more devices (e.g., other devices, such as other beverage dispensing apparatuses) are configured and/or have been configured at and/or near the location in which the beverage dispensing apparatus 100 (e.g., replacement beverage dispensing apparatus) is being configured. If one or more beverage dispensing apparatuses are configured and/or have been configured at the same location of the replacement beverage dispensing apparatus 100, the beverage dispensing apparatus 100 (e.g., replacement beverage dispensing apparatus 100) may request whether the configuration information of the beverage dispensing apparatus 100 to be replaced should be used for the replacement beverage dispensing apparatus 100. If it is indicated (e.g., via a user of the beverage dispensing apparatus or a technician) that that the previous configuration should not be used for the replacement beverage dispensing apparatus 100, the configuration information of the previous beverage dispensing apparatus 100 may not be transferred to the replacement beverage dispensing apparatus. If it is indicated that the previous configuration should be used for the replacement beverage dispensing apparatus, the configuration information of the previous beverage dispensing apparatus 100 may be transferred and/or saved to the beverage dispensing apparatus 100, at 908. At 910, an indication of the configuration, such as whether the configuration was successful, when the configuration took place, and/or where the configuration information was derived from, may be provided by the beverage dispensing apparatus 100.

The beverage dispensing apparatus 100 (e.g., replacement beverage dispensing apparatus) may copy configuration information from one or more beverage dispensing apparatuses. For example, the beverage dispensing apparatus 100 (e.g., replacement beverage dispensing apparatus) may copy configuration information from one or more beverage dispensing apparatuses based on location information (e.g., location information of the replacement beverage dispensing apparatus and/or the location information of the beverage dispensing apparatus being replaced). For example, the beverage dispensing apparatus 100 (e.g., replacement beverage dispensing apparatus) may copy configuration information from one or more beverage dispensing apparatuses based on the replaced beverage dispensing apparatus 100 being at substantially the same location as the beverage dispensing apparatus 100 being replaced, based on a proximity, etc. For example, the configuration of the nearest beverage dispensing apparatus 100 may be used for the replacement beverage dispensing apparatus 100.

As described herein, the beverage dispensing apparatus 100 (e.g., replacement beverage dispensing apparatus 100) may receive and/or download (e.g., automatically receive and/or download) the configuration information, for example, based on location (e.g., GPS) information. The GPS information may include location information of the replacement beverage dispensing apparatus and/or location of one or more other beverage dispensing apparatuses. The beverage dispensing apparatus 100 may download the configuration information based on an event (e.g., a download event of the user), a duration (e.g., weekly), a trend (e.g., users are using the beverage dispensing apparatus 100 less), etc. The beverage dispensing apparatus 100 may indicate that the configuration has been downloaded (e.g., successfully downloaded). The beverage dispensing apparatus 100 may indicate the device(s) from which the beverage dispensing apparatus 100 received the configuration information.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A beverage dispensing apparatus comprising:
   a processor configured to cause the beverage dispensing apparatus to produce a beverage;
   a user interface of the beverage dispensing apparatus configured to, while the beverage dispensing apparatus is producing the beverage or dispensing the beverage:
   display one or more questions related to the operation of the beverage dispensing apparatus;
   receive responses to the one or more questions; +
   generate one or more follow-up questions based on the responses to one or more questions, the one or more follow-up questions related to the operation of the beverage dispensing apparatus; and
   display the one or more follow-up questions; and a memory device operably coupled to the processor and configured to store the responses to at least one of: the one or more questions, or the one or more follow-up questions.

2. The apparatus of claim 1, wherein the processor is further configured such that the responses are further received by the user actuating buttons on the user interface, or a user provision of audio to a microphone, of the beverage dispensing apparatus.

3. The apparatus of claim 1, wherein the user interface further comprises a touch screen, the processor being further configured such that the responses are received via user contact with one or more different portions of the touch screen.

4. The apparatus of claim 1, further comprising a communication interface, wherein the processor is further configured to transmit the responses to one or more external devices.

5. The apparatus of claim 1, further comprising a communication interface, wherein the processor is further configured to receive the responses from one or more external devices via the communication interface.

6. A beverage dispensing apparatus comprising:
   a processor configured to cause the beverage dispensing apparatus to produce a beverage;
   a user interface of the beverage dispensing apparatus comprising a plurality of buttons, at least a first button of the plurality of buttons configured for a user input response of yes, and at least a second button of the plurality of buttons configured for a user input response of no, the user interface configured to, while the beverage dispensing apparatus is producing the beverage or dispensing the beverage:
   display one or more questions related to the operation of the beverage dispensing apparatus, at least some of the one or more questions including yes/no response questions;
   receive responses to at least some of the one or more questions via a user provision of at least one of: a yes, or no, user input response via at least one of: the first button, or the second button; and
   generate one or more follow-up questions based on the responses, the one or more follow-up questions related to the operation of the beverage dispensing apparatus; and
   display the one or more follow-up questions; and
   a memory device operably coupled to the processor and configured to store the responses to the one or more questions.

7. The apparatus of claim 6, wherein the processor is further configured such that the responses are further received by the user actuating buttons on the user interface, or a user provision of audio to a microphone, of the beverage dispensing apparatus.

8. The apparatus of claim 6, wherein the user interface further comprises a touch screen, the processor being further configured such that the responses are received via user contact with one or more different portions of the touch screen.

9. The apparatus of claim 6, further comprising a communication interface, wherein the processor is further configured to transmit the responses to one or more external devices.

10. The apparatus of claim 6, further comprising a communication interface, wherein the processor is further configured to receive the responses from one or more external devices via the communication interface.

11. A method for soliciting user feedback while making and dispensing a beverage with a beverage dispensing apparatus, the method comprising:

causing, via a processor, the beverage dispensing apparatus to produce or dispense a beverage;

while the beverage dispensing apparatus is producing the beverage or dispensing the beverage:

displaying, via a user interface of the beverage dispensing apparatus, one or more questions related to the operation of the beverage dispensing apparatus;

receiving, from a user of the beverage dispensing apparatus, responses to the one or more questions;

generating one or more follow-up questions based on the responses to one or more previously displayed questions, the one or more follow-up questions related to the operation of the beverage dispensing apparatus; and displaying the one or more follow-up questions; and storing the responses to at least one of: the one or more questions, or the one or more follow-up questions on a memory device.

12. The method of claim 11, further comprising further receiving the responses by the user actuating buttons on the user interface, or a user provision of audio to a microphone, of the beverage dispensing apparatus.

13. The method of claim 11, wherein the one or more questions are yes/no questions corresponding to a plurality of buttons, one of the plurality of buttons corresponding to a response of yes and another one of the plurality of buttons corresponding to an answer of no.

14. The method of claim 11, further comprising receiving the responses by the user touching different portions of a touch screen of the user interface.

15. The method of claim 11, further comprising transmitting, via a communication interface, the responses to one or more external devices.

16. The method of claim 11, further comprising receiving, via a communication interface, the responses from one or more external devices.

17. A method for soliciting user feedback while making and dispensing a beverage with a beverage dispensing apparatus, the apparatus comprising:

a user interface of the beverage dispensing apparatus comprising a plurality of buttons, at least a first button of the plurality of buttons configured for a user input response of yes, and at least a second button of the plurality of buttons configured for a user input response of no, the method comprising:

causing, via a processor, the beverage dispensing apparatus to produce a beverage;

while the beverage dispensing apparatus is producing the beverage or dispensing the beverage:

displaying one or more questions related to the operation of the beverage dispensing apparatus, at least some of the one or more questions including yes/no response questions;

receiving responses to at least some of the one or more questions via a user provision of at least one of: a yes, or no, user input response via at least one of: the first button, or the second button;

generating one or more follow-up questions based on the responses, the one or more follow-up questions related to the operation of the beverage dispensing apparatus; and displaying the one or more follow-up questions; and storing responses to the one or more questions via a memory device operably coupled to the processor.

18. The method of claim 17, further comprising:

further receiving responses by the user actuating buttons on the user interface, or a user provision of audio to a microphone, of the beverage dispensing apparatus;

receiving at least some of the responses via user contact with one or more different portions of a touch screen of the apparatus.

19. The method of claim 17, further comprising at least one of:

transmitting, via a communication interface, the responses to one or more external devices; and receiving, via the communication interface, the responses from the one or more external devices.

\* \* \* \* \*